US012688268B2

(12) United States Patent
Haller et al.

(10) Patent No.: US 12,688,268 B2
(45) Date of Patent: Jul. 21, 2026

(54) POSE OPTIMIZATION IN BIOMETRIC AUTHENTICATION SYSTEMS

(71) Applicant: Apple Inc., Cupertino, CA (US)

(72) Inventors: Martin Haller, Mountain View, CA (US); Tom Sengelaub, Oakland, CA (US)

(73) Assignee: Apple Inc., Cupertino, CA (US)

( * ) Notice: Subject to any disclaimer, the term of this patent is extended or adjusted under 35 U.S.C. 154(b) by 202 days.

(21) Appl. No.: 18/027,919

(22) PCT Filed: Sep. 22, 2021

(86) PCT No.: PCT/US2021/051614
§ 371 (c)(1),
(2) Date: Mar. 22, 2023

(87) PCT Pub. No.: WO2022/066816
PCT Pub. Date: Mar. 31, 2022

(65) Prior Publication Data
US 2023/0367857 A1      Nov. 16, 2023

Related U.S. Application Data

(60) Provisional application No. 63/083,761, filed on Sep. 25, 2020.

(51) Int. Cl.
*H04N 23/23* (2023.01)
*G06F 15/16* (2006.01)
(Continued)

(52) U.S. Cl.
CPC ............ *G06F 21/32* (2013.01); *G06V 10/141* (2022.01); *G06V 10/993* (2022.01); *G06V 40/19* (2022.01);
(Continued)

(58) Field of Classification Search
CPC .... G06F 21/32; G06V 10/141; G06V 10/993; G06V 40/19; G06V 40/197; G06V 40/67;
(Continued)

(56) References Cited

U.S. PATENT DOCUMENTS

| | | | |
|---|---|---|---|
| 6,289,113 B1 | 9/2001 | McHugh | |
| 7,068,820 B2 * | 6/2006 | Nakaigawa | ............ G06V 40/67 |
| | | | 348/78 |

(Continued)

FOREIGN PATENT DOCUMENTS

| | | |
|---|---|---|
| CA | 3120035 | 12/2021 |
| CN | 1892676 A | 1/2007 |

(Continued)

OTHER PUBLICATIONS

"Sowon Yoon, Kwanghyuk Bae, Kang Ryoung Park, and Jaihie Kim". "Pan-Tilt-Zoom Based Iris Image Capturing System for Unconstrained User Environments at a Distance." (S.-W. Lee and S.Z. Li (Eds.): ICB 2007, LNCS 4642, pp. 653-662, 2007. @ Springer-Verlag Berlin Heidelberg 2007). (10 Pages). (Year: 2007).*

(Continued)

*Primary Examiner* — Berhanu Shitayewoldetsadik
(74) *Attorney, Agent, or Firm* — Robert C. Kowert; Kowert, Hood, Munyon, Rankin & Goetzel, P.C.

(57) ABSTRACT

Methods and apparatus for biometric authentication in which a current eye pose is determined and evaluated to determine if the current pose is satisfactory, and in which the eye pose may be improved by the user manually adjusting the device or their pose/gaze direction in response to a signal from the controller, and/or in which the imaging system is mechanically adjusted at the direction of the controller to improve the current view of the eye.

20 Claims, 22 Drawing Sheets

(51) Int. Cl.

| | |
|---|---|
| *G06F 21/32* | (2013.01) |
| *G06V 10/141* | (2022.01) |
| *G06V 10/98* | (2022.01) |
| *G06V 40/18* | (2022.01) |
| *G06V 40/19* | (2022.01) |
| *G06V 40/60* | (2022.01) |
| *H04L 15/16* | (2006.01) |
| *H04N 23/56* | (2023.01) |
| *H04N 23/80* | (2023.01) |

(52) U.S. Cl.
CPC ............ *G06V 40/197* (2022.01); *G06V 40/67* (2022.01); *H04N 23/23* (2023.01); *H04N 23/56* (2023.01); *H04N 23/80* (2023.01)

(58) Field of Classification Search
CPC ...... G06V 40/14; G06V 40/171; G06V 40/18; G06V 40/70; G06V 40/165; H04N 23/23; H04N 23/56; H04N 23/611; H04N 23/74; H04N 23/80
USPC ........................................................ 713/186
See application file for complete search history.

(56) References Cited

U.S. PATENT DOCUMENTS

| | | | | |
|---|---|---|---|---|
| 7,155,354 | B1 | 12/2006 | Mooney | |
| 8,433,103 | B2 * | 4/2013 | Friedman | G06V 40/19 |
| | | | | 382/116 |
| 9,004,687 | B2 * | 4/2015 | Stack | A61B 5/6803 |
| | | | | 351/209 |
| 9,767,358 | B2 | 9/2017 | Xue | |
| 9,959,478 | B2 | 5/2018 | Hanna | |
| 10,156,900 | B2 * | 12/2018 | Publicover | G06F 3/012 |
| 10,311,286 | B2 | 6/2019 | Saripalle et al. | |
| 10,354,158 | B2 | 7/2019 | Zhou | |
| 10,401,158 | B2 | 9/2019 | Gemoth | |
| 10,890,968 | B2 | 1/2021 | Kurlethimar | |
| 10,970,574 | B2 | 4/2021 | Joshi | |
| 11,210,380 | B2 | 12/2021 | Hoyos et al. | |
| 11,906,742 | B2 | 2/2024 | Kaehler et al. | |
| 2002/0136435 | A1 * | 9/2002 | Prokoski | G06V 40/45 |
| | | | | 382/118 |
| 2004/0151347 | A1 * | 8/2004 | Wisniewski | G06V 40/16 |
| | | | | 382/115 |
| 2005/0249385 | A1 | 11/2005 | Kondo | |
| 2005/0271258 | A1 | 12/2005 | Rowe | |
| 2008/0037841 | A1 * | 2/2008 | Ogawa | G06V 10/7715 |
| | | | | 382/118 |
| 2010/0149315 | A1 | 6/2010 | Qu | |
| 2010/0316263 | A1 | 12/2010 | Hamza | |
| 2011/0163163 | A1 | 7/2011 | Rowe | |
| 2012/0154536 | A1 | 6/2012 | Stoker et al. | |
| 2013/0227651 | A1 * | 8/2013 | Schultz | G06F 21/32 |
| | | | | 726/4 |
| 2013/0250087 | A1 * | 9/2013 | Smith | G06F 3/013 |
| | | | | 348/78 |
| 2014/0044318 | A1 * | 2/2014 | Derakhshani | G06V 40/45 |
| | | | | 382/117 |
| 2014/0044321 | A1 * | 2/2014 | Derakhshani | G06V 40/45 |
| | | | | 382/117 |
| 2014/0099005 | A1 * | 4/2014 | Mogi | G06V 40/172 |
| | | | | 382/118 |
| 2014/0283113 | A1 | 9/2014 | Hanna | |
| 2015/0262024 | A1 | 9/2015 | Braithwaite | |
| 2016/0019421 | A1 | 1/2016 | Feng | |
| 2016/0087952 | A1 * | 3/2016 | Tartz | H04W 12/06 |
| | | | | 455/411 |
| 2016/0117544 | A1 | 4/2016 | Xue | |
| 2016/0132735 | A1 * | 5/2016 | Derakhshani | G06V 40/40 |
| | | | | 382/117 |
| 2016/0180143 | A1 * | 6/2016 | Horesh | G06V 40/193 |
| | | | | 348/44 |

| | | | | |
|---|---|---|---|---|
| 2016/0360970 | A1 | 12/2016 | Tzvieli | |
| 2017/0124392 | A1 | 5/2017 | Gu | |
| 2017/0205875 | A1 | 7/2017 | Kaehler | |
| 2017/0206412 | A1 | 7/2017 | Kaehler | |
| 2017/0308763 | A1 * | 10/2017 | Salmelin | G06V 40/67 |
| 2017/0337441 | A1 | 11/2017 | Mapen | |
| 2018/0025244 | A1 * | 1/2018 | Bohl | G06V 40/45 |
| | | | | 382/116 |
| 2018/0032815 | A1 | 2/2018 | Lee | |
| 2018/0039846 | A1 | 2/2018 | Grubb | |
| 2018/0113508 | A1 | 4/2018 | Berkner-Cieslicki | |
| 2018/0120932 | A1 | 5/2018 | Sengelaub | |
| 2018/0150690 | A1 | 5/2018 | Yin | |
| 2018/0285669 | A1 | 10/2018 | Mapen et al. | |
| 2018/0330490 | A1 | 11/2018 | Kido | |
| 2018/0349721 | A1 | 12/2018 | Agrawal et al. | |
| 2018/0365490 | A1 | 12/2018 | Agrawal | |
| 2019/0044723 | A1 | 2/2019 | Prakash | |
| 2019/0057268 | A1 | 2/2019 | Burge | |
| 2019/0073533 | A1 * | 3/2019 | Chen | G06V 40/197 |
| 2019/0094981 | A1 | 3/2019 | Bradski | |
| 2019/0278987 | A1 | 9/2019 | Eskilsson | |
| 2019/0347483 | A1 | 11/2019 | Krichen | |
| 2019/0387168 | A1 | 12/2019 | Smith | |
| 2020/0012105 | A1 | 1/2020 | Liu | |
| 2020/0127267 | A1 * | 4/2020 | Dulle | B60L 3/12 |
| 2020/0218887 | A1 | 7/2020 | He | |
| 2020/0241635 | A1 * | 7/2020 | Cohen | G06F 3/147 |
| 2020/0258044 | A1 | 8/2020 | Joshi | |
| 2020/0293757 | A1 | 9/2020 | Nilsson | |
| 2020/0311238 | A1 | 10/2020 | Ackerman | |
| 2020/0334478 | A1 | 10/2020 | Hecht | |
| 2021/0081652 | A1 | 3/2021 | Matsunami | |
| 2021/0318558 | A1 | 10/2021 | Tzvieli | |
| 2021/0334581 | A1 | 10/2021 | Gandara | |
| 2021/0365533 | A1 | 11/2021 | Kaplan et al. | |
| 2021/0365535 | A1 | 11/2021 | Casteneda | |
| 2022/0253135 | A1 | 8/2022 | Cohen | |
| 2023/0222197 | A1 | 7/2023 | Derakhshani et al. | |
| 2025/0103693 | A1 | 3/2025 | Maila et al. | |

FOREIGN PATENT DOCUMENTS

| | | | | |
|---|---|---|---|---|
| CN | 101411606 | A | 4/2009 | |
| CN | 101520838 | | 9/2009 | |
| CN | 101814129 | | 5/2013 | |
| CN | 103870819 | A | 6/2014 | |
| CN | 104301633 | A | 1/2015 | |
| CN | 105874472 | A | 8/2016 | |
| CN | 106462236 | A | 2/2017 | |
| CN | 107087431 | A | 8/2017 | |
| CN | 104933344 | | 1/2019 | |
| CN | 109508695 | | 3/2019 | |
| CN | 113505357 | | 10/2021 | |
| CN | 114596622 | | 6/2022 | |
| EP | 3506196 | | 7/2019 | |
| GB | 2471192 | | 12/2010 | |
| JP | H10 137225 | | 5/1998 | |
| JP | 2017047724 | A | 3/2017 | |
| JP | 2017191374 | | 10/2017 | |
| JP | 7485448 | B2 | 12/2020 | |
| KR | 20180072734 | A * | 6/2018 | |
| KR | 20180100890 | | 9/2018 | |
| KR | 20200127267 | A * | 11/2020 | H04N 23/90 |
| KR | 102483345 | B1 * | 12/2022 | G06V 40/197 |
| WO | 98/08439 | | 3/1998 | |
| WO | 2017031089 | A1 | 2/2017 | |
| WO | 2017/052807 | | 3/2017 | |
| WO | 2017/162504 | | 9/2017 | |
| WO | 2018/100241 | | 6/2018 | |
| WO | 2019/118716 | | 6/2019 | |
| WO | 2020/141537 | | 7/2020 | |
| WO | 2023149829 | | 8/2023 | |

OTHER PUBLICATIONS

Invitation to pay additional fees, Partial International Search, date of mailing Dec. 7, 2021, pp. 1-16.

(56) References Cited

OTHER PUBLICATIONS

Sowon Yoon, et al., "Pan-Tilt-Zoom Based Iris Image Capturing System for Unconstrained User Environments at a Distance", Aug. 27, 2007, ICIAP: International Conference of Image Analysis and Processing, 17th International Conference, pp. 653-662.

Ken Hughes et al., "Detection of Contact-Lens-Based Iris Biometric Spoofs Using Stereo Imaging", 46th Hawaii International Conference on System Sciences, Jan. 1, 2013, pp. 1763-1772 [2013].

International Search Report and Written Opinion from PCT/US2021/051612, date of mailing Dec. 23, 2021, pp. 1-13.

International Search Report and Written Opinion from PCT/US2021/051613, date of mailing Nov. 23, 2021, pp. 1-12.

Hau T Ngo, et al., "Design and implementation of a multispectral iris capture system", Signals, Systems and Computers, 2009 Conference Record of the Forty-third ASIMLOMAR Conference, IEE, Nov. 1, 2009, pp. 380-384 [2009].

Thavalengal Shejin et al., "Proof-of-concept and evaluation of a dual function visible/NIR camera for iris authentication in smartphones", IEEE Transactions on Consumer Electronics, IEEE Service Center, vol. 61, No. 2, May 2015, pp. 137-143, [2015].

International Search Report and Written Opinion from PCT/US2021/051615, date of mailing Dec. 9, 2021, all pages.

Emine Krichen et al., "Color-Based Iris Verification", Proceedings of ICB: International Conference on Advances in Biometrics, Aug. 27, 2007, pp. 997-1005 [2007].

International Search Report and Written Opinion from PCT/US2021/051611, date of mailing Jan. 2, 2022, pp. 1-13.

U.S. Appl. No. 18/027,910, filed Mar. 22, 2023, Martin Haller, et al.

U.S. Appl. No. 18/027,916, filed Mar. 22, 2023, Martin Haller, et al.

U.S. Appl. No. 18/027,914, filed Mar. 22, 2023, Martin Haller, et al.

U.S. Appl. No. 18/027,912, filed Mar. 22, 2023, Martin Haller, et al.

International Preliminary Report from PCT Application No. PCT/US2021/051614, dated Sep. 22, 2021, pp. 1-19.

Anil K. Jain, et al., "50 years of biometric research: Accomplishments, challenges, and opportunities," Pattern Recognition Letters, Elsevier, Amsterdam, NL, vol. 79, Jan. 12, 2016, pp. 80-105.

Olade, et al., "A Review of Multimodal Facial Biometric Authentication Methods in Mobile Devices and Their Application in Head Mounted Displays," 2018 IEEE SmartWorld, SmartWorld/SCALCOM/UIC/ATC/CBDCom/IOP/SCI, 2018, pp. 1997-2004, doi: 10.1109/SmartWorld.2018-00334.

"Information technology—Biometric data Interchange," Part 6: Iris image data, BS ISO/IEC 19794-6:2011+A1:2015, Incorporating corrigenda Apr. 2012 and Sep. 2013, bsi, pp. 1-78.

Galbally Javier et al.,. "A review of iris anti=spoofing," 2016 4th International Conference on Biometrics and Forensics (IWBF), IEEE, Mar. 3, 2016, XP032890563, pp. 1-6.

Venkatesh, et al., "A New Multi-spectral Iris Acquisition Sensor for Biometric Verification and Presentation Attack Detection," IEEE, Jan. 2019, pp. 47-54.

Examiner Report from Application No. 21801270.6-1218, dated May 14, 2025, pp. 1-8.

Lee Eui Chul, "Fake iris detection method using Purkinje images based on gaze position," Optical Engineering, vol. 47, No. 61, Jun. 2008, XP093275560, p. 067204.

U.S. Appl. No. 19/449,142, filed Jan. 14, 2026, Sanjiv Das, et al.

U.S. Appl. No. 19/449,270, filed Jan. 14, 2026, Sanjiv Das, et al.

Tao, et al., "Biometric Authentication System on Mobile Personal Devices," In IEEE Transactions Instrumentation and Measurement, vol. 59, No. 4, pp. 763-773, Apr. 2010.

Okabe, et al., "Smart Device-Based Multimodal Biometric Authentication with the Function for Environment Recognition," 2015 Third International Symposium on Computing and Networking (CANDAR), 2015, pp. 495-498.

Hemery, et al., "Face Authentication for Banking," First International Conference on Advances in Computer-Human Interaction, 2008, pp. 137-142.

Smith-Creasey, et al., "Context Awareness for Improved Continuous Face Authetication on Mobile Devices," 2018 IEEE 16th Intl Conf on Dependable, Autonomic and secure Computing, pp. 644-652, 2018.

U.S. Appl. No. 19/349,858, filed Oct. 3, 2025, Martin Haller, et al.

* cited by examiner

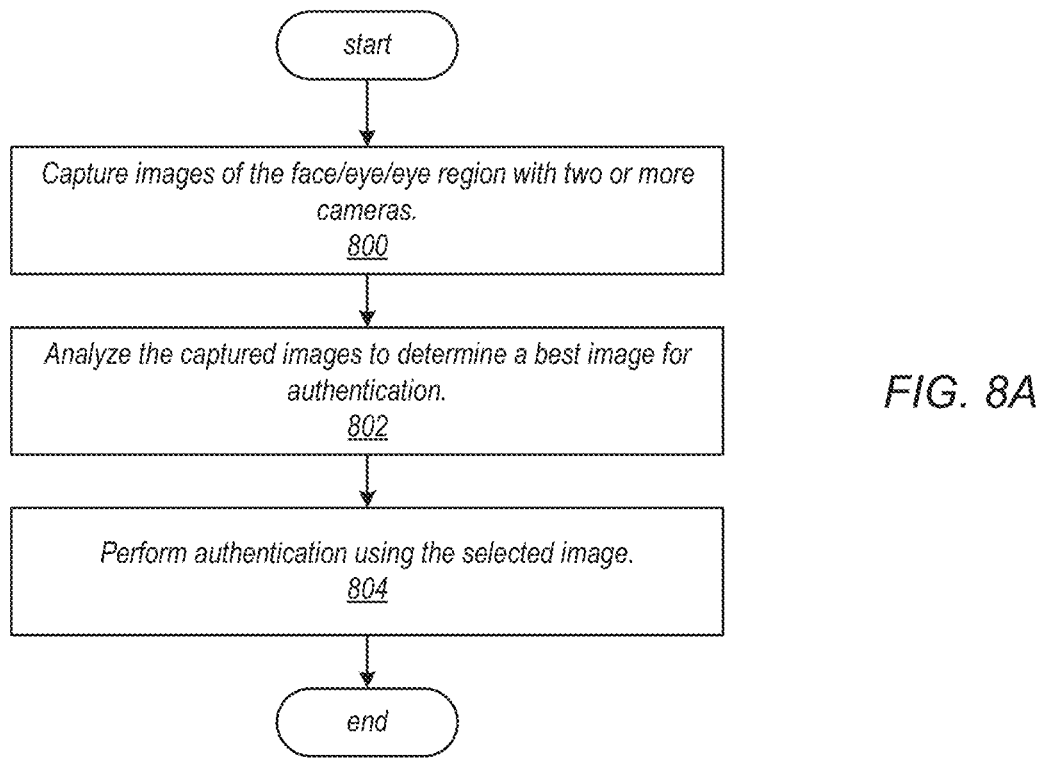
*FIG. 8A*
*FIG. 8B*
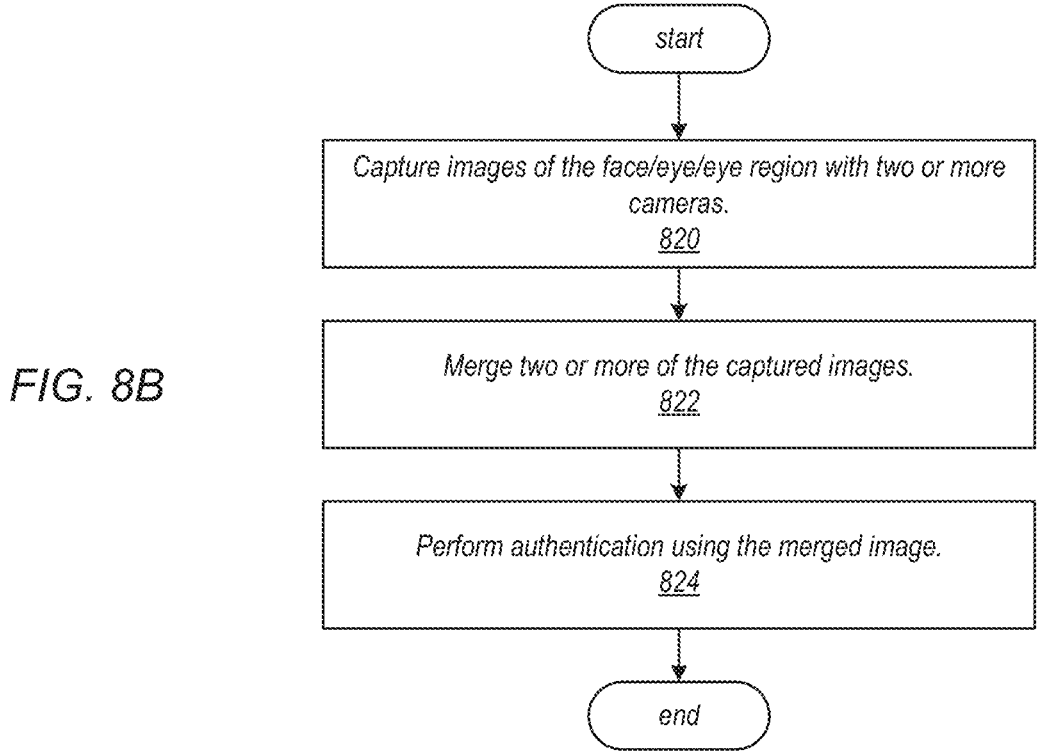

POSE OPTIMIZATION IN BIOMETRIC AUTHENTICATION SYSTEMS

This application is a 371 of PCT Application No. PCT/US2021/051614, filed Sep. 22, 2021 which claims benefit of priority to U.S. Provisional Patent Application No. 63/083,761, filed Sep. 25, 2020. The above applications are incorporated herein by reference. To the extent that any material in the incorporated application conflicts with material in the incorporated application conflicts with material expressly set forth herein, the material expressly set forth herein controls.

BACKGROUND

An eye or gaze tracker is a device for estimating eye positions and eye movement. Eye tracking systems have been used in research on the visual system, in psychology, psycholinguistics, marketing, and as input devices for human-computer interaction. In the latter application, typically the intersection of a person's point of gaze with a desktop monitor is considered.

Biometric authentication technology uses one or more features of a person to identify that person, for example for secure, authenticated access to devices, systems, or rooms. In a typical scenario, in a registration process one or more images are captured of the features being tracked (e.g., images of a person's iris(es)), and the images are processed to generate a set or vector of metrics that are unique to, and thus uniquely identify, that person. When the person attempts to access the device, system, or room, images of the person's features are again captured and processed using a similar algorithm to the one used during registration. The extracted metrics are compared to the baseline metrics and, if the match is sufficiently good, the person is allowed access.

SUMMARY

Embodiments of methods and apparatus for biometric authentication are described in which a current eye pose is determined and evaluated to determine if the current pose is satisfactory, and in which the eye pose may be improved by the user manually adjusting the device or their pose/gaze direction in response to a signal from the controller, and/or in which the imaging system is mechanically adjusted at the direction of the controller to improve the current view of the eye.

In embodiments, a method executed on the controller may identify the user's current eye location and/or orientation (pose), for example by capturing and evaluating one or more images of the eye(s). The controller may then evaluate how beneficial the current pose is for biometric authentication. In some embodiments, the controller may provide feedback to the user to prompt the user to adjust their pose (e.g., by changing the direction of their gaze) or to manually adjust the device (e.g., by manually moving the device's position in relation to their eyes). In some embodiments, instead or in addition to prompting the user to manually adjust their pose or the device, the controller may direct the imaging system hardware to mechanically adjust the imaging system, for example by slightly moving or tilting the camera, or by zooming in or out. Adjusting the pose of the user with respect to the imaging system manually or mechanically may ensure a desired level biometric authentication performance, as better images of the eye or eye region may be captured. Feedback to the user may be a haptic, audio, or visual signal, or a combination of two or more haptic, audio, or visual signals. The automatic adjustment of the imaging system directed by the controller may move a component or a combination of components, for example a module that includes at least the camera. The manual or automatic adjustments may be a single step in the biometric authentication process, or alternatively may be performed in a control loop until certain qualities or objective criteria are achieved in the captured images.

BRIEF DESCRIPTION OF THE DRAWINGS

FIG. 8A is a flowchart of a method for biometric authentication using multiple cameras, according to some embodiments.

FIG. 8B is a flowchart of another method for biometric authentication using multiple cameras, according to some embodiments.

Figure 1A:
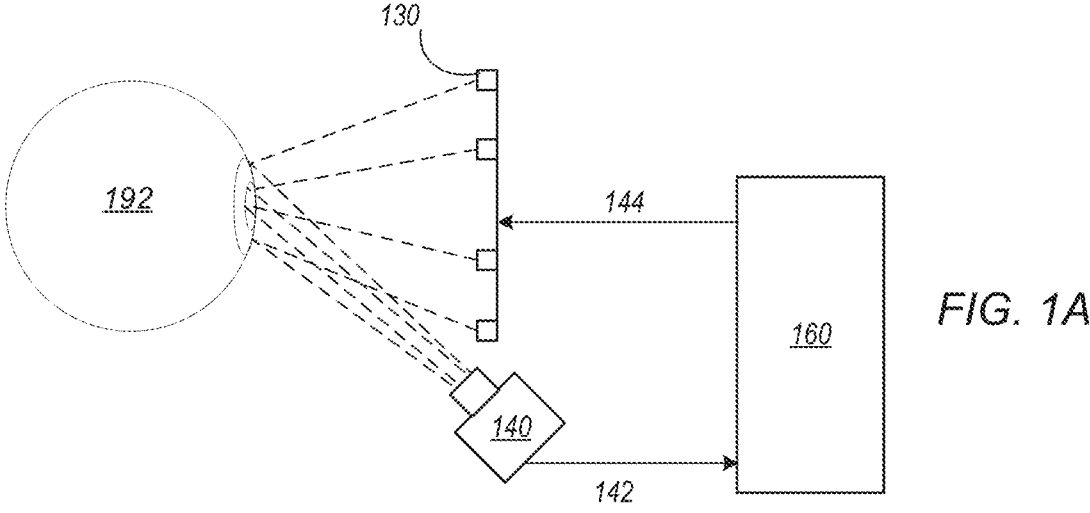
FIGS. 1A through 1D illustrate example eye camera systems, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values.

The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for flexible illumination in imaging systems are described. An imaging system as described herein may include two or more illumination sources (e.g., point light sources such as light-emitting diodes (LEDs)) that illuminate an object to be imaged (e.g., a person's eye or eye region), and at least one camera configured to capture images of light from the illumination sources reflected by the object when illuminated.

Embodiments of the imaging system may, for example, be used for biometric authentication, for example using features of the user's eyes such as the iris, the eye region (referred to as the periocular region), or other parts of the user's face such as the eyebrows. A biometric authentication system uses one or more of the features to identify a person, for example for secure, authenticated access to devices, systems, or rooms. In a registration process one or more images are captured of the features being tracked (e.g., images of a person's iris(es), periocular region, etc.), and the images are processed to generate a set or vector of metrics that are unique to, and thus uniquely identify, that person. When the person attempts to access the device, system, or room, images of the person's features are again captured and processed using a similar algorithm to the one used during registration. The extracted metrics are compared to the baseline metrics and, if the match is sufficiently good, the person may be allowed access.

Another example use for embodiments of the imaging system is in gaze tracking. A gaze tracking system may, for example, be used to compute gaze direction and a visual axis using glints and eye features based on a three-dimensional (3D) geometric model of the eye.

Embodiments of the imaging system described herein may, for example, be used in a biometric authentic process, a gaze tracking process, or both. Another example is in anti-spoofing, which is related to biometric authentication in that "spoofing" refers to attempts to trick a biometric authentication system by, for example, presenting a picture or model of a valid user's eye, eye region, or face. More generally, embodiments of the imaging system may be implemented in any application or system in which images of an object illuminated by a light source are captured by one or more cameras for processing.

A non-limiting example application of the methods and apparatus for flexible illumination in imaging systems are in systems that include at least one eye camera (e.g., infrared (IR) cameras) positioned at each side of a user's face, and an illumination source (e.g., point light sources such as an array or ring of IR light-emitting diodes (LEDs)) that emit light towards the user's eyes. The imaging system may, for example, be a component of a head-mounted device (HMD), for example a HMD of an extended reality (XR) system such as a mixed or augmented reality (MR) system or virtual reality (VR) system. The HMD may, for example be implemented as a pair of glasses, googles, or helmet. Other example applications for the imaging system include mobile devices such as smartphones, pad or tablet devices, desktop computers, and notebook computers, as well as stand-alone biometric authentication systems mounted on walls or otherwise located in rooms or on buildings. In any of these example systems, the imaging system may be used for biometric authentication, gaze tracking, or both.

Figure 1B:
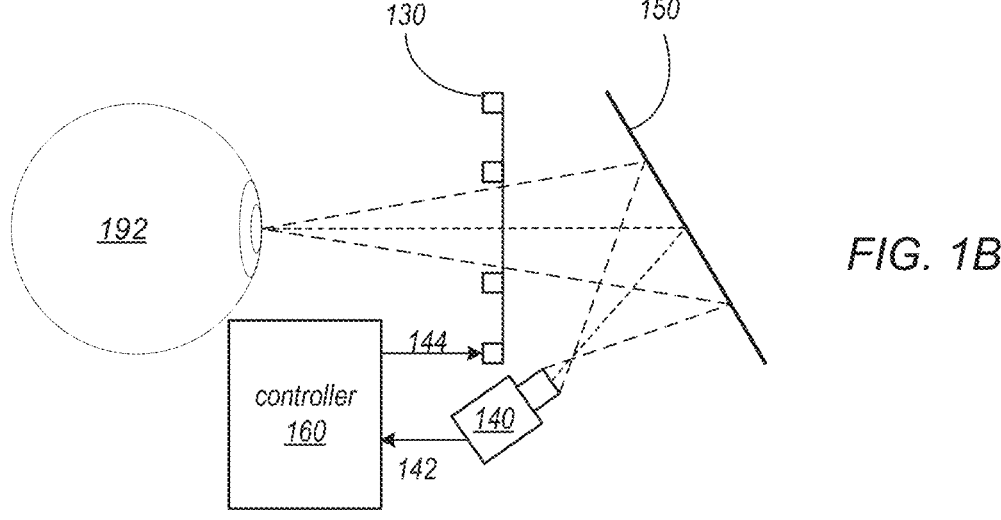
Figure 1C:
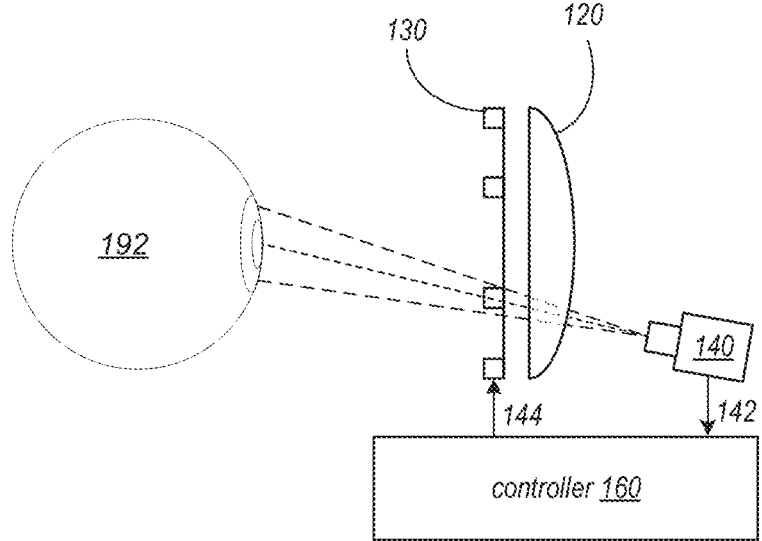

FIGS. 1A through 1D illustrate example imaging systems, according to some embodiments. The imaging system may include, but is not limited to, one or more cameras 140, an illumination source 130, and a controller 160. FIG. 1A shows an imaging system in which the eye camera 140 images the eye 192 directly. However, in some embodiments the eye camera 140 may instead image a reflection of the eye 192 off of a hot mirror 150 as shown in FIG. 1B. In addition, in some embodiments, the eye camera 140 may image the eye through a lens 120 of an imaging system, for example as shown in FIG. 1C.

In some embodiments, a device (e.g., a head-mounted device (HMD)) may include an imaging system that includes at least one eye camera 140 (e.g., infrared (IR) cameras) positioned on one side or at each side of the user's face, and an illumination source 130 (e.g., point light sources such as an array or ring of IR light-emitting diodes (LEDs)) that emits light towards the user's eye(s) 192 or periorbital region.

Figure 1D:
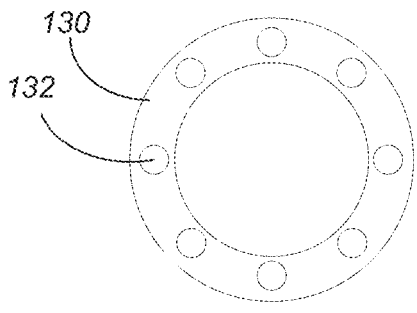

FIG. 1D shows an example illumination source 130 that includes multiple LEDs 132. In this example, there are eight LEDs 132 arranged in a ring. Note, however, that the number and arrangement of the LEDS 132 in an illumination source 130 may be different. In addition, in some embodiments other light-emitting elements than LEDs may be used. In some embodiments, the LEDs 132 may be configured to emit light in the IR (including SWIR or NIR) range, for example at 740, 750, 840, 850, 940, or 950 nanometers.

The eye camera 140 may be pointed towards the eye 192 to receive light from the illumination source 130 reflected from the eye 192, as shown in FIG. 1A. However, in some embodiments the eye camera 140 may instead image a reflection of the eye 192 off of a hot mirror 150 as shown in FIG. 1B. In addition, in some embodiments, the eye camera 140 may image the eye 192 through a lens 120 or other optical element of the device, for example as shown in FIG. 1C.

The device that includes the imaging system may include a controller 160 comprising one or more processors and memory. Controller 160 may include one or more of various types of processors, image signal processors (ISPs), graphics processing units (GPUs), coder/decoders (codecs), and/or other components for processing and rendering video and/or images. In some embodiments, the controller 160 may be integrated in the device. In some embodiments, at least some of the functionality of the controller 160 may be implemented by an external device coupled to the device by a wired or wireless connection. While not shown in FIGS. 1A through 1C, in some embodiments controller 160 may be coupled to an external memory for storing and reading data and/or software.

The controller 160 may send control signals to the illumination source 130 and camera 140 to control the illumination of the eye 192 and capture of images of the eye 192. The controller 160 may use input 142 (e.g., captured images of the eyes 192) from the eye cameras 140 for various purposes, for example for biometric authentication or gaze tracking. The controller 160 may implement algorithms that estimate the user's gaze direction based on the input 142. For example, the controller 160 may implement algorithms that process images captured by the cameras 140 to identify features of the eye 192 (e.g., the pupil, iris, and sclera) or periorbital region to be used in biometric authentication algorithms. As another example, the controller 160 may implement gaze tracking algorithms that process images captured by the cameras 140 to identify glints (reflections of the LEDs 130) obtained from the eye cameras 140. The information obtained from the input 142 may, for example, be used to determine the direction in which the user is currently looking (the gaze direction), and may be used to construct or adjust a 3D model of the eye 192.

However, in a device that implements the imaging system, components of the device may result in unwanted reflections and stray light on the final image captured by camera 140. As the imaging system becomes more complex, for example with optical surfaces (e.g., lenses 120 and/or mirrors 150) involved in the trajectory between the point light sources 130 and camera 140, the higher the likelihood of getting unwanted reflections and stray light on the final image captured by camera 140, for example caused by reflections in lenses, imperfections in lenses or optical surfaces, or dust on optical surfaces. When using the imaging for biometric authentication and/or for gaze tracking, components of the device (e.g., lenses) may block, refract, or reflect light, including a portion of the light from the illumination source 130 and ambient light, if present. In addition, position of the device and imaging system with respect to the user's head may shift during use. Other aspects of the device and imaging system may change. For example, a surface of a lens in the device may become smudged, or the user may add or change something such as clip-on lenses to the device. Thus, quality of the images captured with the imaging system may vary depending on the current lighting conditions, position of the device and imaging system with respect to the user's head, and other factors such as smudges or other changes to the device. The quality of the captured images may affect the efficiency and accuracy of algorithms used in various applications including but not limited to biometric authentication, anti-spoofing, and gaze tracking.

Embodiments of the methods and apparatus for flexible illumination in imaging systems as described herein may improve the performance and robustness of an imaging system, and may help to adapt the imaging system to specific users, conditions, and setup for applications including but not limited to biometric authentication, anti-spoofing, and gaze tracking.

Figure 2:
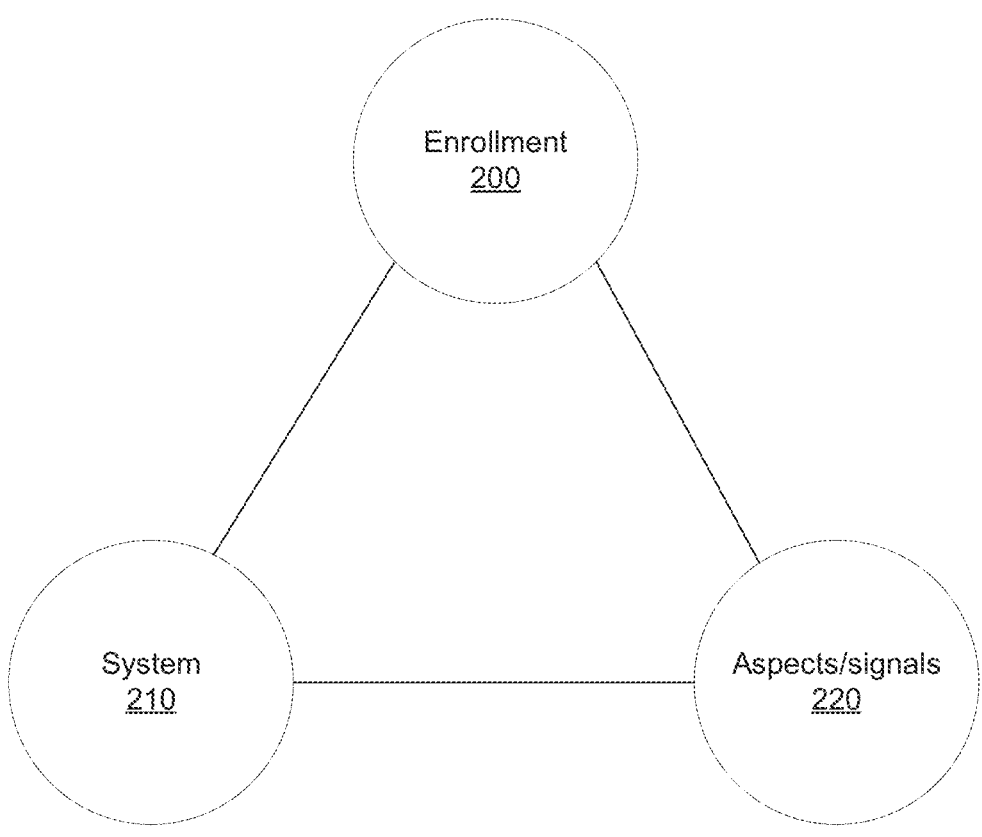
FIG. 2 graphically illustrates tradeoffs between complexities in a biometric authentication system, according to some embodiments.

FIG. 2 graphically illustrates tradeoffs between complexities in a biometric authentication system, according to some embodiments. Embodiments of an imaging system used for biometric authentication as described herein may trade off system complexity 210 for complexity in the enrollment 200 process. A more complex system 210 may reduce the complexity of the enrollment process for the user, for example by automating processes such as shifting the camera to get a better view of the eye rather than having the user move the device manually. Conversely, the enrollment 200 process could be made more complex to reduce system complexity 210. Similarly, biometric authentication may be improved by increasing the number of aspects 220 of the user's eyes and periorbital region that are used in the identification process at the expense of system complexity 210 and possibly enrollment complexity 200. Similar tradeoffs may apply in other applications such as gaze tracking.

Flexible Illumination for Imaging Systems

Embodiments of imaging systems that implement flexible illumination methods are described. Embodiments may provide methods that improve the performance and robustness of an imaging system, and that make the imaging system adaptable to specific users, conditions, and setup for biometric authentication using the eyes and periorbital region, gaze tracking, and anti-spoofing. While, conventional eye tracking systems focus on specular reflections or glints for gaze tracking, embodiments may focus on other aspects such as providing uniform, good contrast on the iris or other regions of interest, reducing or illuminating shadows on regions of interest, and other improvements for biometric authentication applications.

In embodiments, two or more different lighting configurations for the imaging system in a device are pre-generated. Each lighting configuration may specify one or more aspects of lighting including, but not limited to, which LEDs or group of LEDs to enable or disable, intensity/brightness, wavelength, shapes and sizes of the lights, direction, sequences of lights, etc. One or more lighting configurations may be generated for each of two or more poses, where a pose is a 3D geometrical relationship between the eye camera and the user's current eye position and gaze direction. A lookup table may be generated via which each pose is associated with its respective lighting configuration(s). The lookup table and lighting configurations may, for example be stored to memory of the device and/or to memory accessible to the device via a wired or wireless connection In some embodiments, the lighting configurations may be pre-generated synthetically for a device and imaging system, for example using a 3D geometric model or representation of the device and imaging system to generate lighting configurations for a set of estimated poses. Alternatively, in some embodiments, the lighting configurations may be pre-generated using a data set of images of real-world user faces to obtain pose information. As another alternative, in some embodiments, the lighting configurations may be generated during an initialization process for a particular user. For example, in some embodiments, the user puts on or holds the device and moves their gaze around, and the system/controller runs through a process during which images are captured and processed with different light settings to determine optimal lighting configurations for this user when capturing images of the desired features at two or more different poses.

In some embodiments, after the lighting configurations and lookup table are generated, the user may put on, hold, or otherwise use the device. A biometric authentication process may be initiated in which different lighting configurations may be selected by the controller to capture optimal images of the desired features of the user's eye (e.g., iris, periorbital region, etc.) at different poses and in different conditions for use by the biometric authentication algorithms executed by the controller.

In some embodiments, the device may initiate a biometric authentication process when the user accesses the device. In some embodiments, the device's controller may begin the biometric authentication process with a default initial lighting configuration. One or more images may be captured by the imaging system using the respective setting for the illumination source, and the captured image(s) may be checked for quality. If the images are satisfactory for the algorithms that process the images to perform biometric authentication using one or more features of the user's eye, periorbital region, and/or other facial features, then the flexible illumination process may be done. Otherwise, the controller may select another lighting configuration, direct the illumination source to illuminate the subject according to the new lighting configuration, and direct the camera to capture one or more images that are checked for quality. This process may be repeated until a successful authentication has been achieved, or for a specified number of attempts until the authentication attempt is considered failed. In some embodiments, the user's current pose may be determined by the imaging system and controller, for example using a gaze tracking algorithm, and the user's current pose may be used to select an initial lighting configuration and, if necessary, one or more subsequent lighting configurations for the biometric authentication process.

A similar method may be applied in a gaze tracking process in which different lighting configurations are selected by the controller to obtain better images of the desired features of the user's eyes (e.g., glints) at different poses and in different conditions.

Embodiments of the flexible illumination method may improve the performance and robustness of an imaging system, and may help to adapt the imaging system to specific users, conditions, and setup for applications including but not limited to biometric authentication, anti-spoofing, and gaze tracking. Embodiments may capture and process images of the eye or periorbital region using one or more different lighting configurations until a lighting configuration is found that provides optimal (or at least good enough) images to perform a particular function (e.g., biometric authentication, gaze tracking, etc.), thus improving the performance and robustness of the device, system, and/or algorithm that uses image(s) of the eye or periorbital region in performing the function (e.g., biometric authentication, gaze tracking, etc.).

By dynamically searching for and finding a good or optimal lighting configuration for current conditions, embodiments of the flexible illumination method may help to make an imaging system adaptable to one or more of, but not limited to:

the anatomy and appearance of users of a device or system that includes the imaging system;

environmental/ambient lighting conditions;

reflections, streaks, ghosts, stray light, etc. that may be visible in captured images of the eye or periorbital region;

changes in the optical path between at least one of the LEDs in the illumination source, the eye or periorbital region, and at least one eye camera, including but not limited indirect optical paths with enclosures or other elements of a device that includes the imaging system, which may result in additional reflections or visual impairment of the captured images;

other changes in the device that includes the imaging system, such as the addition of clip-on lenses to the device; and variations in prescriptions specific to particular users that may be used in optical elements of the device that or one the optical path between the LEDs of the illumination source and the eye camera(s).

Embodiments of the flexible illumination method may, for example, be implemented in any of the illumination systems as illustrated in FIGS. 1A through 1D. FIGS. 19A through 21 illustrate example devices and systems that may include imaging systems that implement embodiments of the flexible illumination method. An illumination system that implements the flexible illumination may include, but is not limited to:

at least one eye camera (e.g., an infrared (IR) or near-infrared (NIR) camera, an RGB or RGB-D camera, etc.); and an illumination source that includes multiple light-emitting elements which can be controlled individually or in groups (e.g., IR or NIR LEDs, or LEDs in other wavelengths).

In embodiments, a controller of the device that includes the imaging system may control one or more of, but not limited to, the following based on a current lighting configuration:

turning individual, or groups of, the light-emitting elements on or off;

increasing or decreasing the intensity/current to individual, or groups of, the light-emitting elements; and sequencing of individual, or groups of, the light-emitting elements.

In embodiments, the light-emitting elements, or groups of the light-emitting elements, may differ in one or more of, but not limited to, the following:

wavelength;

location and orientation (pose);

shape;

size; and light emitting angular profile.

In some embodiments, individual light-emitting elements or groups of light-emitting elements may include additional optical elements, for example lenses, grids, etc., that affect light emitted by the elements or groups of light-emitting elements.

The following broadly describes a method for selecting a lighting configuration, according to some embodiments. One or more images of a user's eye or periorbital region may be captured using a first lighting configuration. Additional images may be captured using at least one additional lighting configuration. One or more objective criteria (e.g., contrast, shadows, edges, undesirable streaks, etc.) may be selected or determined for analyzing the images. Based on an analysis of the captured images using the objective criteria, one of the lighting configurations that corresponds to one or more image(s) that best satisfies the objective criteria for this user may be selected. In some embodiments, if a change in the conditions under which the lighting configuration was selected is detected (e.g., some change in the user's position or appearance, a change in ambient lighting, a change to the device that includes the imaging system, etc.), then the method for selecting a lighting configuration may be repeated.

The objective criteria used in selecting lighting configurations may differ based on the particular application. For example, in a biometric authentication process that uses the iris to authenticate users, the algorithm may need images of the iris with uniform, good contrast, no shadows, etc. In a gaze tracking process, the algorithm may need images that include specular reflections or glints in certain locations and/or of certain sizes and number.

In some embodiments, the objective criteria used in selecting lighting configurations may differ based on the environment (e.g., internal vs external ambient conditions). In some embodiments, the objective criteria used in selecting lighting configurations may differ based on varying gaze poses or adjustments to a user's face, for example eye relief (depth) and interpupillary distance (IPD).

Figure 3:
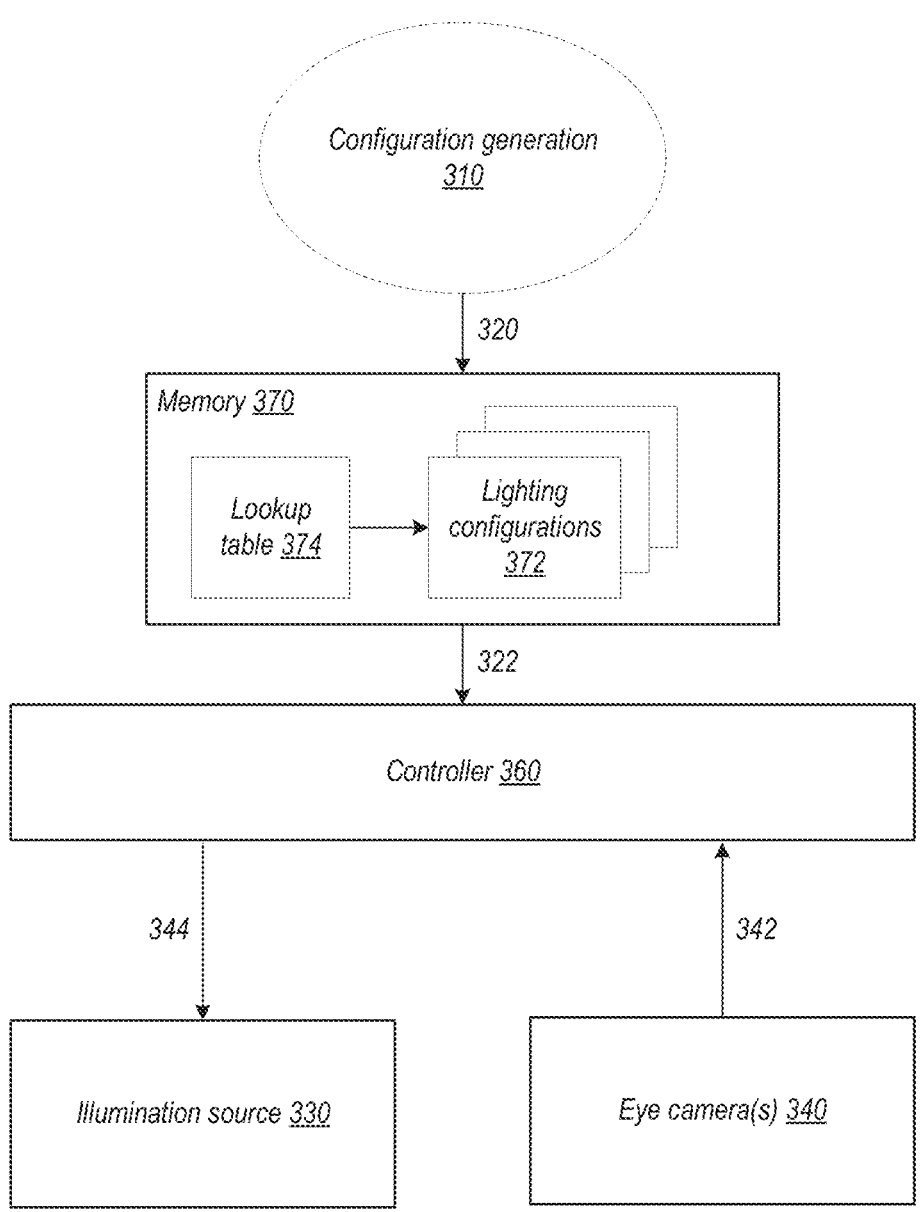
FIG. 3 is a block diagram of an imaging systems that implements a flexible illumination method, according to some embodiments.

FIG. 3 is a block diagram of an imaging systems that implements a flexible illumination method, according to some embodiments. Two or more lighting configurations 372 may be generated in a configuration generation 310 process. In some embodiments, the lighting configurations may be pre-generated synthetically for a device and imaging system, for example using a 3D geometric model or representation of the device and imaging system to generate lighting configurations for a set of estimated poses. Alternatively, in some embodiments, the lighting configurations may be pre-generated using a data set of images of real-world user faces to obtain pose information. As another alternative, in some embodiments, the lighting configurations may be generated during an initialization process for a particular user. For example, in some embodiments, the user puts on or holds the device and moves their gaze around, and the system/controller runs through a process during which images are captured and processed with different light settings to determine optimal lighting configurations for this user when capturing images of the desired features at two or more different poses.

The pre-generated lighting configurations 372 may be stored 320 to memory 370 accessible to controller 360. In some embodiments, a lookup table 374 may be generated and stored to memory 370 that, for example, maps particular poses to particular lighting configurations.

In some embodiments, after the lighting configurations 372 and lookup table 374 are generated and stored, a user may put on, hold, or otherwise use a device that includes the controller 360, illumination source 330, and eye camera(s) 340. A biometric authentication process may be initiated in which different lighting configurations 372 may be selected by the controller 360 to capture optimal images of the desired features of the user's eye (e.g., iris, periorbital region, etc.) at different poses and in different conditions for use by the biometric authentication algorithms executed by the controller 360.

In some embodiments, the device may initiate a biometric authentication process when the user accesses the device. In some embodiments, the device's controller 360 may begin a biometric authentication process by directing 344 the illumination source 330 to use a default initial lighting configuration 372. One or more images may be captured 342 by the eye camera(s) 340 using the respective lighting provided by the illumination source 330, and the captured image(s) may be checked for quality according to one or more objective criteria or measures as previously described. If the images are satisfactory for the biometric authentication algorithms that rely on one or more features of the user's eye, periorbital region, and/or other facial features captured in the images, then the flexible illumination process may be done. Otherwise, the controller 360 may select another lighting configuration 372, direct the illumination source 330 to illuminate the subject according to the new lighting configuration 372, and direct the camera to capture 342 one or more images with the new lighting configuration 372 that are checked for quality according to one or more objective criteria. This process may be repeated until a successful authentication has been achieved, or for a specified number of attempts until the authentication attempt is considered failed. In some embodiments, the user's current pose may be determined by the imaging system and controller 360, for example using a gaze tracking algorithm, and the user's current pose may be used to select an initial lighting configuration 372 and, if necessary, one or more subsequent lighting configurations 372 for the biometric authentication process.

A similar method may be applied in a gaze tracking process in which different lighting configurations 372 are selected by the controller 360 to obtain better images of the desired features of the user's eyes (e.g., glints) at different poses and in different conditions using one or more objective criteria.

Figure 4:
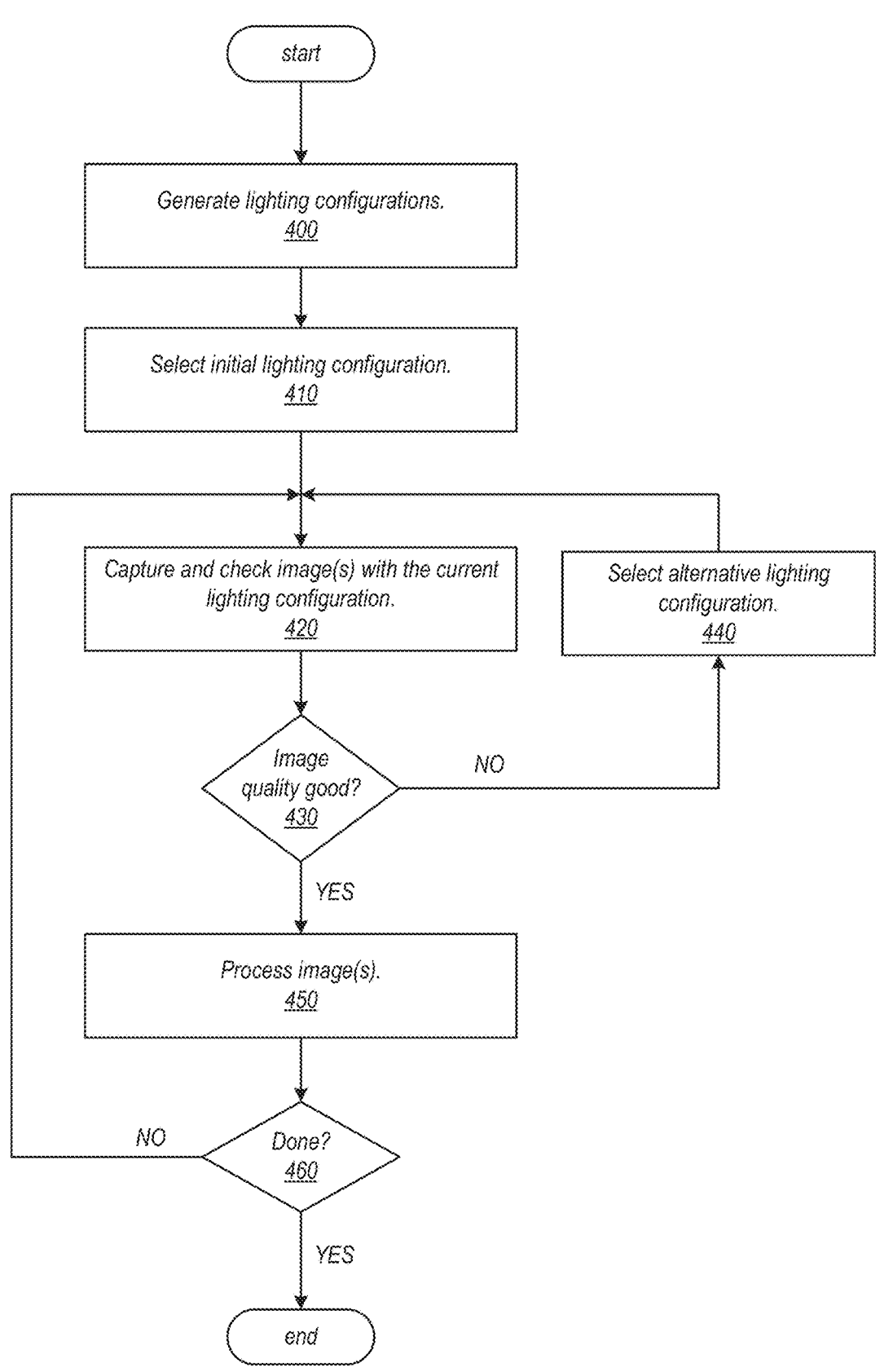
FIG. 4 is a flowchart of a method for providing flexible illumination in an imaging system, according to some embodiments.

FIG. 4 is a flowchart of a method for providing flexible illumination in an imaging system, according to some embodiments. As indicated at 400, two or more lighting configurations may be generated and stored to a memory. In some embodiments, a lookup table that maps poses to lighting configurations may also be generated and stored. As indicated at 410, an initial lighting configuration may be selected. As indicated at 420, one or more images may be captured with the current lighting configuration and analyzed according to one or more objective criterial. At 430, if the image quality is determined to be not good enough for the algorithm that uses the images (e.g., a biometric authentication algorithm) according to the objective criteria, then another lighting configuration may be selected as indicated at 440, and the method returns to element 420 to capture and check additional images. At 430, if the image quality is determined to be good for the algorithm that uses the images (e.g., a biometric authentication algorithm), then the images may be processed by the algorithm as indicated at 450. At 460, if more images need to be processed (e.g., if the biometric authentication algorithm could not make an identification based on the images at 450), then the method returns to element 420. Otherwise, the method is done.

Biometric Authentication Using Multiple Biometric Aspects

Embodiments of methods and apparatus for biometric authentication are described in which two or more biometric features or aspects are captured and analyzed individually or in combination to identify and authenticate a person. Conventionally, biometric authentication has been performed using a single biometric feature. For example, an image of a person's iris is captured and compared to a baseline image of the user's iris to identify and authenticate the person. In embodiments, an imaging system, for example as illustrated in FIGS. 1A through 1D, is used to capture images of a person's iris, eye, periorbital region, and/or other regions of the person's face, and two or more features from the captured images are analyzed individually or in combination to identify and authenticate the person (or to detect attempts to spoof the biometric authentication). Embodiments may improve the performance of biometric authentication systems, and may help to reduce false positives and false negatives by the biometric authentication algorithms, when compared to conventional systems that rely on only one feature for biometric authentication. Embodiments may be especially advantageous in imaging systems that have challenging hardware constrains (point of view, distortions, etc.) for individual biometric aspects or features (e.g., the iris) as additional biometric features (e.g., veins in the eye, portions or features of the periorbital region, or features of other parts of the face) may be used for biometric authentication if good images of one or more of the biometric features cannot be captured at a particular pose or under current conditions.

The biometric aspects that are used may include one or more of facial, periocular, or eye aspects. For each biometric aspect, one or more different features may be used to describe or characterize the aspect; the different features may, for example, include geometric features, qualitative features, and low-level, intermediate, or high-level 3D representations. The biometric aspects and features may include, but are not limited to, one or more of the eye surface, eye veins, eyelids, eyebrows, skin features, and nose features, as well as features of the iris such as color(s), pattern(s), and 3D musculature. In some embodiments, feature sizes and geometric relations to other features may be included as biometric aspects.

Figure 5A:
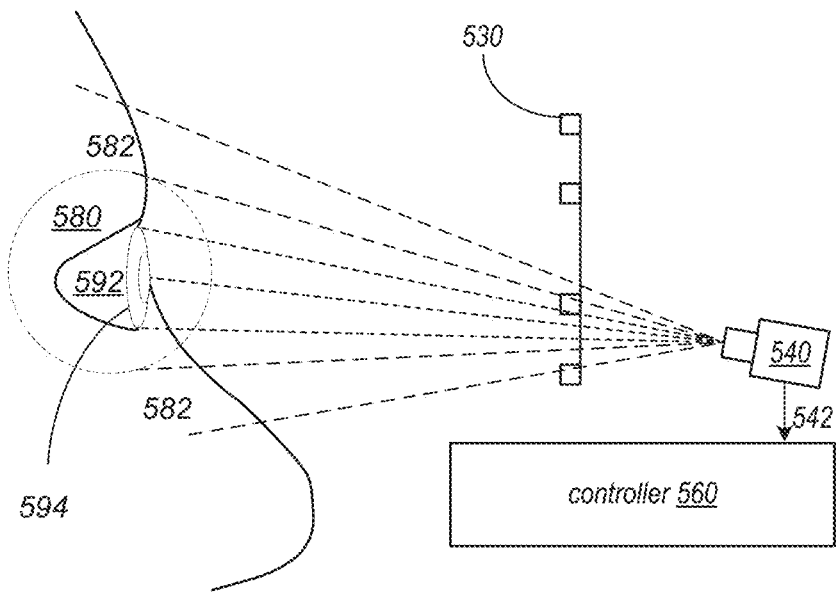
FIGS. 5A and 5B illustrate a biometric authentication system that combines different biometric aspects, according to some embodiments.
Figure 5B:
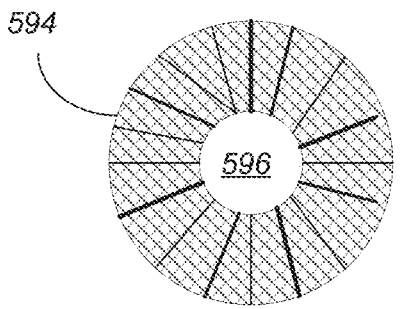

FIGS. 5A and 5B illustrate a biometric authentication system that combines different biometric aspects, according to some embodiments. FIG. 5A illustrates an example imaging system that combines different biometric aspects, according to some embodiments. The imaging system may include, but is not limited to, one or more cameras 540, an illumination source 530, and a controller 560. In this example, the eye camera 540 is pointed towards the eye 592, periorbital region 580, and portions of the face 582 to receive reflected light from the illumination source 530. Note, however, in some embodiments, the eye camera 540 may image a reflection off a hot mirror as shown in FIG. 1B. Further, in some embodiments, the eye camera 540 may image the user's facial region including the eye 592 through one or more intermediate optical elements as shown in FIG. 1C. The eye camera(s) 540 may capture 542 individual images of, or images that include, two or more biometric aspects of the eye 592, periorbital region 580, and portions of the face 582. The captured image(s) may be processed by controller 560 to analyze the quality of two or more of the biometric aspects captured in the image(s). Depending on the particular application, the controller 560 may select a best biometric aspect or feature from the images to be used for biometric authentication, or may select two or more of the biometric aspects or features to be used in combination for biometric authentication.

FIG. 5B is an illustration of the iris 594 and pupil 596 of the eye. In some embodiments, features of the iris 594 such as color(s), pattern(s), and a 3D reconstruction of muscle patterns in the iris 594 based on two or more images may be used as biometric aspects or features. An iris 594 feature may be used alone, in combination with one or more iris 594 features, or in combination with one or more other features of the eye 592, periorbital region 580, or face 582 to perform biometric authorization.

Figure 6:
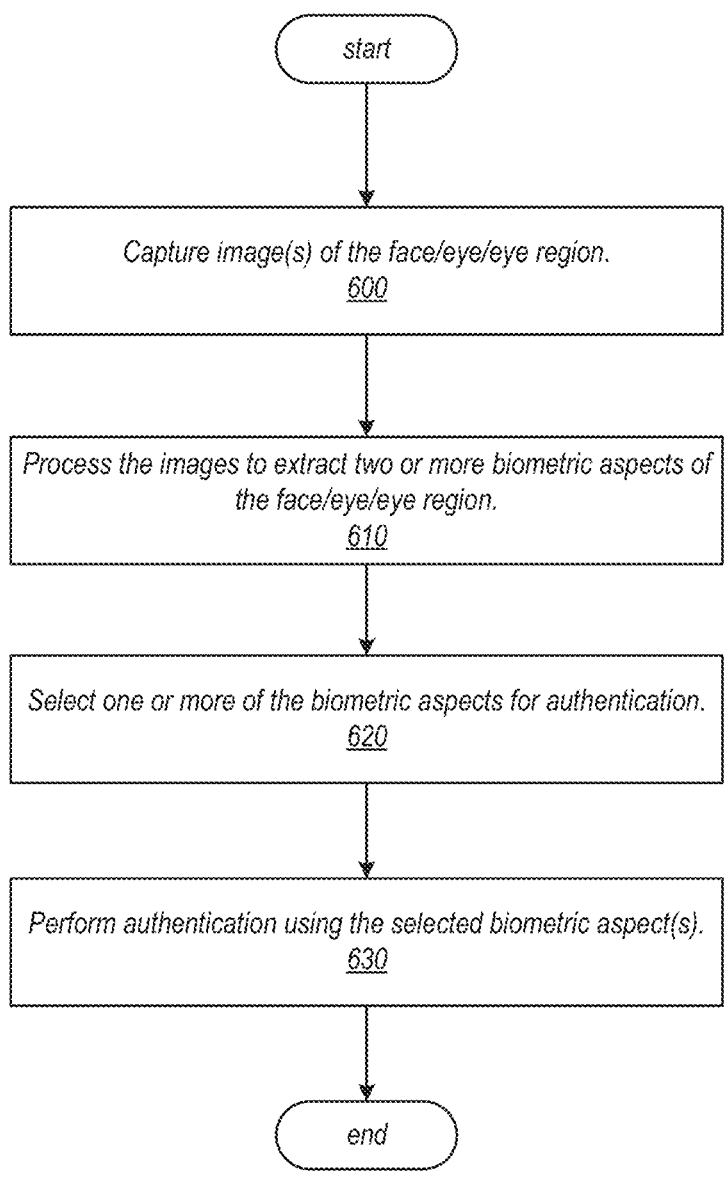
FIG. 6 is a flowchart of a method for performing biometric authentication using multiple biometric aspects, according to some embodiments.

FIG. 6 is a flowchart of a method for performing biometric authentication using multiple biometric aspects, according to some embodiments. As indicated at 600, one or more images of the user's iris 594, eye 592, periorbital region 580, and/or face 582 may be captured by one or more eye cameras. As indicated at 610, the images may be processed to extract two or more biometric aspects of the user's iris 594, eye 592, periorbital region 580, and/or face 582. As indicated at 620, one or more of the biometric aspects may be selected for authentication. For example, objective criteria may be applied to the extracted biometric aspects to determine whether the biometric aspects meet thresholds of quality for the biometric authentication algorithms. One or more of the biometric aspects that meet respective thresholds may then be selected. As indicated at 630, biometric authentication may then be performed using the selected biometric aspect(s).

Biometric Imaging System Using Multiple Cameras

Embodiments of methods and apparatus for biometric authentication are described in which two or more cameras are used to capture images of biometric features or aspects for analysis to identify and authenticate a person. Conventionally, biometric authentication has been performed using a single camera to capture images of biometric features. For example, an image of a person's iris is captured by a single eye camera and compared to a baseline image of the user's iris to identify and authenticate the person. In embodiments, an imaging system, for example as illustrated in FIGS. 1A through 1D, includes at least two cameras that are used to capture images of a person's iris, eye, periorbital region, and/or other regions of the person's face, and one or more features from the captured images are analyzed to identify and authenticate the person (or to detect attempts to spoof the biometric authentication).

Embodiments may, for example, be used to capture images of the user's iris using two or more eye cameras for biometric authentication. In some embodiments, instead of or in addition to the iris, two or more cameras may be used to capture biometric aspects or features of the eye, periorbital region, or user's face including but not limited to the eye surface, eye veins, eyelid, eye brows, skin, or nose, and use the biometrics alone or in combination to perform biometric authentication. In some embodiments, feature sizes and geometric relations to other features may be included as biometric aspects.

Embodiments of biometric systems or algorithms may use images from at least one of the two or more cameras (two or more per eye, in some systems) that capture images from different viewpoints of the user's eye, periorbital region, or face to perform biometric authentication. In conventional biometric systems, typically a single camera is pointed directly at the eye region. However, in some compact systems such as HMDs, with an eye camera, the optical path to the target region may be more complex, with other elements such as lenses or hot mirrors on or near the optical path, and thus the visibility of target aspects or features may be impaired, and the quality of the captured images may be less than optimal for the biometric authentication algorithms. Adding at least one additional camera per eye may, for example, allow the imaging system to capture images of the eye region from different angles, and allow for switching to a more favorable point of view (pose as location and orientation), and in some embodiments may allow for two or more images captured by two or more cameras to be combined for use in biometric authentication.

In some embodiments, an algorithm executing on a controller coupled to the two more cameras may dynamically determine which image(s) captured by the two or more cameras are to be used for biometric authentication, for example using one or more objective criteria to evaluate the quality of the captured images. The objective criteria may include one or more of, but are not limited to, exposure, contrast, shadows, edges, undesirable streaks, occluding objects, sharpness, uniformity of illumination, absence of undesired reflections, etc. In addition, properties of the region being captured by a camera may be evaluated to determine quality, for example an overlap of a part of the eye by an eyelid may obscure at least part of a feature in an image captured by one camera while the feature is more visible in an image captured by a second camera.

In some embodiments, an algorithm executing on a controller coupled to the two more cameras may combine information from two or more images of an eye, the periorbital region, or portions of the face captured by at least two cameras to process aspects and features extracted from the combined images. The combination of information from two or more images may be performed at different stages of processing. For example, in some embodiments, two or more images may be combined early in processing to enhance the image quality of the resulting combined image from which aspects or features are extracted and evaluated. As another example, two or more images may be processed to extract aspects, features or other information in an intermediate stage; the extracted information may then be processed in combination to determine a biometric authentication score. As yet another example, the information extracted from two or more images may be processed separately, and then combined in the computation of a final similarity/matching score.

Figure 7:
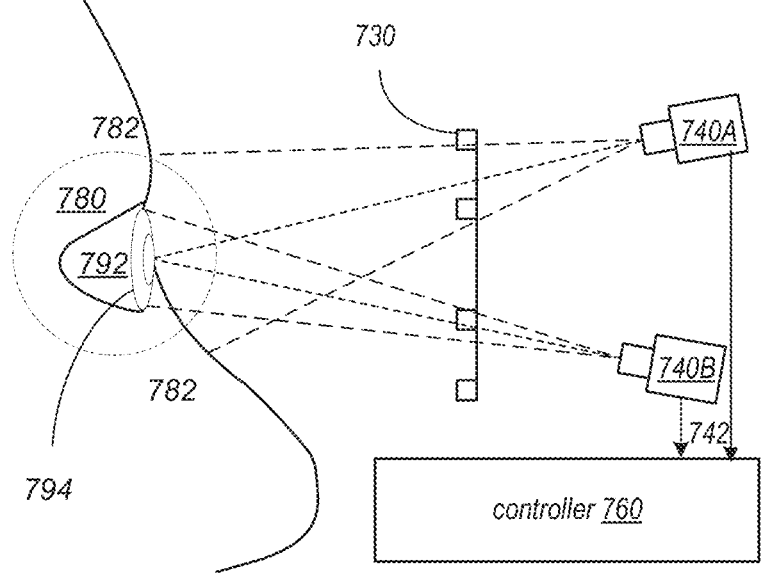
FIG. 7 illustrates a biometric authentication system that uses multiple cameras, according to some embodiments.

FIG. 7 illustrates a biometric authentication system that uses multiple cameras, according to some embodiments. An imaging system may include, but is not limited to, two or more cameras 740, an illumination source 730, and a controller 760. In this example, the eye cameras 540 are each pointed towards the eye 792, periorbital region 780, and/or portions of the face 782 to receive reflected light from the illumination source 730. Each camera 740 has a different perspective or viewing angle. Also note that, while not shown, each camera 740 may center on or capture a different feature, aspect, or region of the user's face or eye 792. In some embodiments, at least one eye camera 740 may image a reflection off a hot mirror as shown in FIG. 1B. Further, in some embodiments, at least one eye camera 740 may image the user's facial region including the eye 792 through one or more intermediate optical elements as shown in FIG. 1C. Each eye camera 740 may capture 742 images of, or images that include, one or more biometric aspects of the eye 792, periorbital region 780, and portions of the face 782. The images captured by the two or more cameras 740 may be processed by controller 760 to analyze the quality the image(s). Depending on the particular application, the controller 560 may select one or more of the images to be used for biometric authentication, or may select two or more of the biometric aspects or features from one or more of the images to be used in combination for biometric authentication.

FIG. 8A is a flowchart of a method for biometric authentication using multiple cameras, according to some embodiments. As indicated at 800, two or more images of the user's eye, periorbital region, or portions of the user's face are captured by two or more cameras. As indicated at 802, the captured images are analyzed using one or more objective criteria to determine a best image to use for biometric authentication. As indicated at 804, biometric authentication is performed using the selected image.

FIG. 8B is a flowchart of another method for biometric authentication using multiple cameras, according to some embodiments. As indicated at 820, two or more images of the user's eye, periorbital region, or portions of the user's face are captured by two or more cameras. As indicated at 822, information from two or more of the images is merged or combined. As indicated at 824, biometric authentication is performed using the merged image information.

The merging of information from two or more images may be performed at different stages of processing. For example, in some embodiments, two or more images may be combined early in processing to enhance the image quality of the resulting combined image from which aspects or features are to be extracted and evaluated. As another example, two or more images may be processed to extract aspects, features or other information in an intermediate stage; the extracted information may then be processed in combination to determine a biometric authentication score. As yet another example, the information extracted from two or more images may be processed separately, and then combined in the computation of a biometric authentication score.

Biometric Imaging Systems Including Additional Optical Elements

Embodiments of methods and apparatus for biometric authentication are described in which one or more additional optical elements are on the optical path from the illumination system, to the eye or eye region, and then to the eye camera.

In some embodiments, one or more optical elements such as a lens 120 as shown in FIG. 1C may be on the optical path between the eye 192 and the camera 140. The optical element may have optical properties; in some embodiments the optical properties may be particular to a user, such as diopter. In some embodiments, a user may add an extra optical element, such as prescription clip-on lens, to the device's optical system. The intervening optical element(s) necessarily affect light that passes through the element(s) to the camera. In some embodiments, information about the optical properties of the intervening optical element(s) may be obtained and stored, and the controller may adjust images captured by the camera(s) according to the information to improve image quality for use in biometric authentication.

In some embodiments, one or more optical elements such as lenses, prisms, diffraction gratings, or waveguides may be located on the optical path of the eye camera, for example in front of the camera and between the camera and the eye/eye region. In some devices, for example in a HMD with limitations for where eye cameras can be placed, an eye camera may view the eye or eye region from a non-optimal angle due to the physical configuration and limitations of the device the imaging system is implemented in. An image plane formed at the camera at the non-optimal angle may affect the quality of the captured images, for example by reducing pixel density. An optical element such as a lens, prism, diffraction grating, or waveguide on the optical path between the eye/eye region and the eye camera may, for example, be used to "bend" the light rays coming from the eye/eye region, and thus tilt the image plane, to obtain better pixel density at the eye camera. In other words, the intervening optical element may compensate for perspective distortion caused by the camera's position. The intervening optical element may thus increase or improve the image space properties of the imaging system.

Figure 9A:
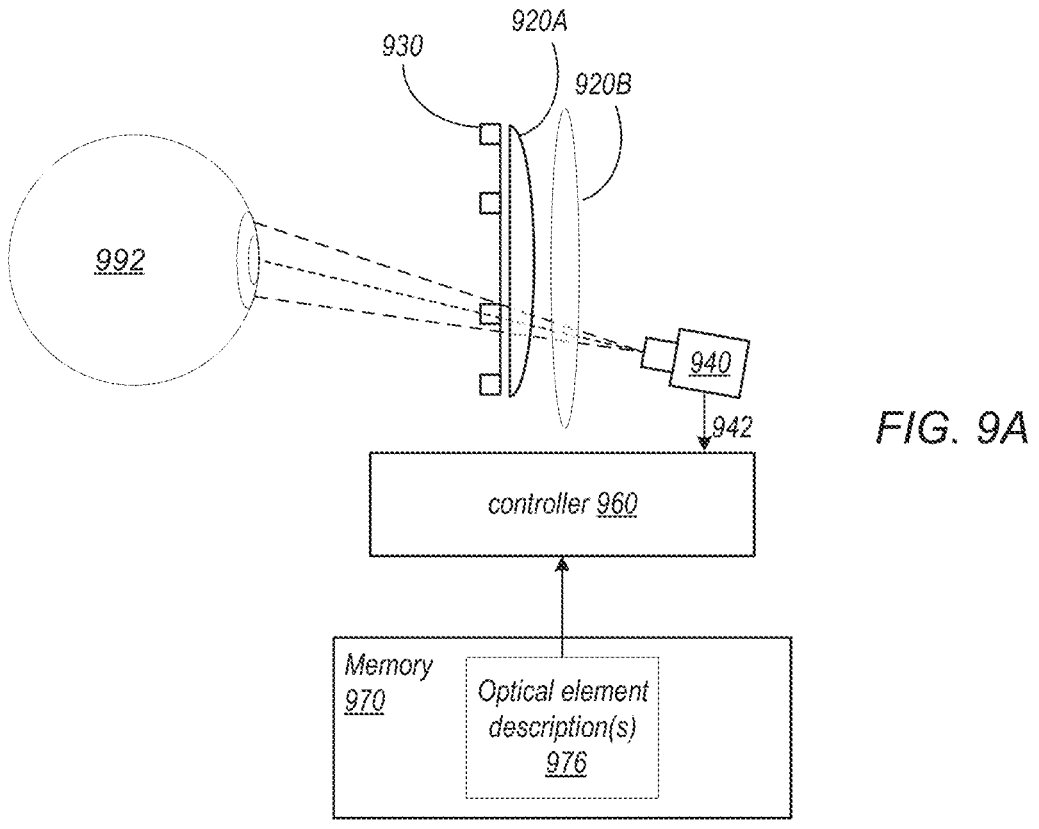
FIG. 9A illustrates a system that includes at least one additional optical element on the light path between the user's eye and the eye camera, according to some embodiments.

FIG. 9A illustrates a system that includes at least one additional optical element on the light path between the user's eye and the eye camera, according to some embodiments. An imaging system may include, but is not limited to, one or more cameras 940, an illumination source 930, and a controller 960. In this example, the eye camera 940 is pointed towards the eye 992; note, however, that an eye camera 940 may also or instead capture images of the periorbital region or portions of the face to receive reflected light from the illumination source 930. Note, however, in some embodiments, the eye camera 940 may image a reflection off a hot mirror as shown in FIG. 1B. The eye camera 940 may image the user's facial region including the eye 992 through one or more intermediate optical elements 920A and 920B. Element 920A represents a lens that is a component of an optical system implemented in the device, and may, but does not necessarily, have optical properties particular to a user. Element 920B represents an optional optical element, such as a clip-on lens, that has been added to an optical system implemented in the device, and may, but does not necessarily, have optical properties particular to a user. The eye camera(s) 940 may capture 942 individual images of, or images that include, two or more biometric aspects of the eye 992, periorbital region 980, and portions of the face 982. However, the optical path from the eye region to the eye camera(s) 940 passes through the intervening optical element 920A and/or optical element 920B.

The intervening optical elements 920A and/or 920B necessarily affect light that passes through the element(s) to the camera 940. In some embodiments, information about the optical properties of the intervening optical element(s) (optical element description(s) 976) may be obtained and stored to memory 970, and the controller 960 may adjust images captured by the camera(s) 940 according to the information to improve image quality for use in biometric authentication.

The captured image(s) may be further processed by controller 960 to analyze the quality of one or more of the biometric aspects captured in the image(s). The image(s) or biometric aspect(s) or features(s) extracted from the image(s) may then be used in a biometric authentication process.

Figure 9B:
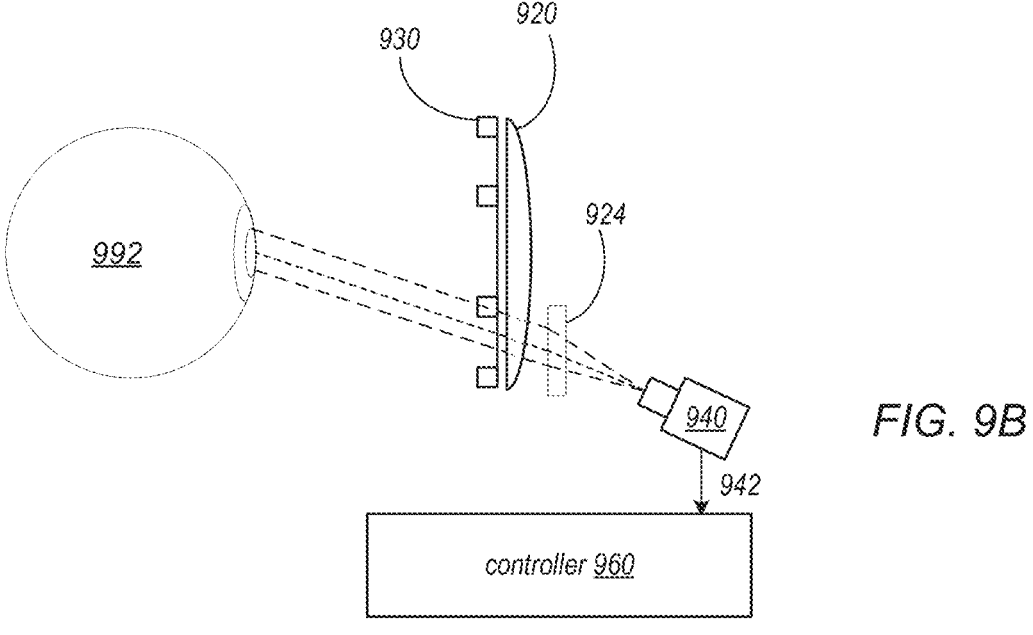
FIG. 9B illustrates a system that includes a diffractive optical element on the light path between the user's eye and the eye camera to improve the viewing angle of the camera, according to some embodiments.

FIG. 9B illustrates a system that includes a diffractive optical element on the light path between the user's eye and the eye camera to improve the viewing angle of the camera, according to some embodiments. An imaging system may include, but is not limited to, one or more cameras 940, an illumination source 930, and a controller 960. In this example, the eye camera 940 is pointed towards the eye 992; note, however, that an eye camera 940 may also or instead capture images of the periorbital region or portions of the face to receive reflected light from the illumination source 930. Note, however, in some embodiments, the eye camera 940 may image a reflection off a hot mirror as shown in FIG. 1B. The eye camera 940 may, but does not necessarily image the user's facial region including the eye 992 through one or more intermediate optical elements 920. The eye camera(s) 940 may capture 942 individual images of, or images that include, two or more biometric aspects of the eye 992, periorbital region 980, and portions of the face 982.

One or more optical elements 924 such as lenses, prisms, diffraction gratings, or waveguides may be located on the optical path of the eye camera 940, for example in front of the camera 940 and between the camera 940 and the eye 992. In some devices, for example in a HMD with limitations for where eye cameras 940 can be placed, an eye camera 940 may view the eye 992 or eye region from a non-optimal angle due to the physical configuration and limitations of the device the imaging system is implemented in. An image plane formed at the camera 940 at the non-optimal angle may affect the quality of the captured images, for example by reducing pixel density. An optical element 924 such as a lens, prism, diffraction grating, or waveguide on the optical path between the eye 992 and the eye camera 940 may, for example, be used to "bend" the light rays coming from the eye 992, and thus tilt the image plane, to obtain better pixel density at the eye camera 940. In other words, the intervening optical element 924 may compensate for perspective distortion caused by the camera 940's position. The intervening optical element 924 may thus increase or improve the image space properties of the imaging system.

The captured image(s) may be processed by controller 960 to analyze the quality of one or more of the biometric aspects captured in the image(s). The image(s) or biometric aspect(s) or features(s) extracted from the image(s) may then be used in a biometric authentication process.

Figure 10:
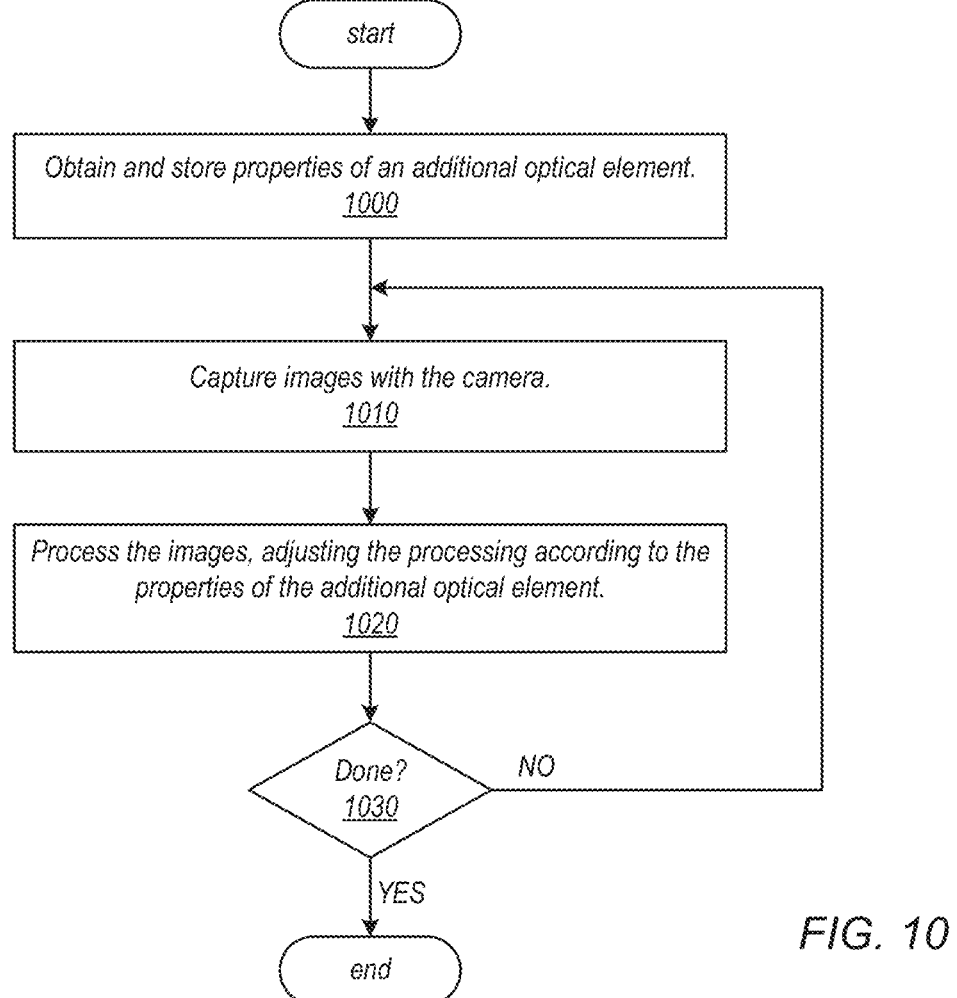
FIG. 10 is a flowchart of a method for processing images in a system that includes at least one additional optical element on the light path between the user's eye and the eye camera, according to some embodiments.

FIG. 10 is a flowchart of a method for processing images in a system that includes at least one additional optical element on the light path between the user's eye and the eye camera, according to some embodiments. As indicated at 1000, properties of one or more additional optical elements on the optical path between the eye camera and the eye or eye region may be obtained and stored as optical element descriptions to memory. As indicated at 1010, one or more images of the eye or eye region may be captured with the eye camera. As indicated at 1020, the captured images may be processed by the controller; the optical element description(s) may be applied to the images to adjust the image processing according to the optical properties of the additional optical element(s). At 1030, if processing is done, the method ends. Otherwise the method returns to element 1010.

Figure 11:
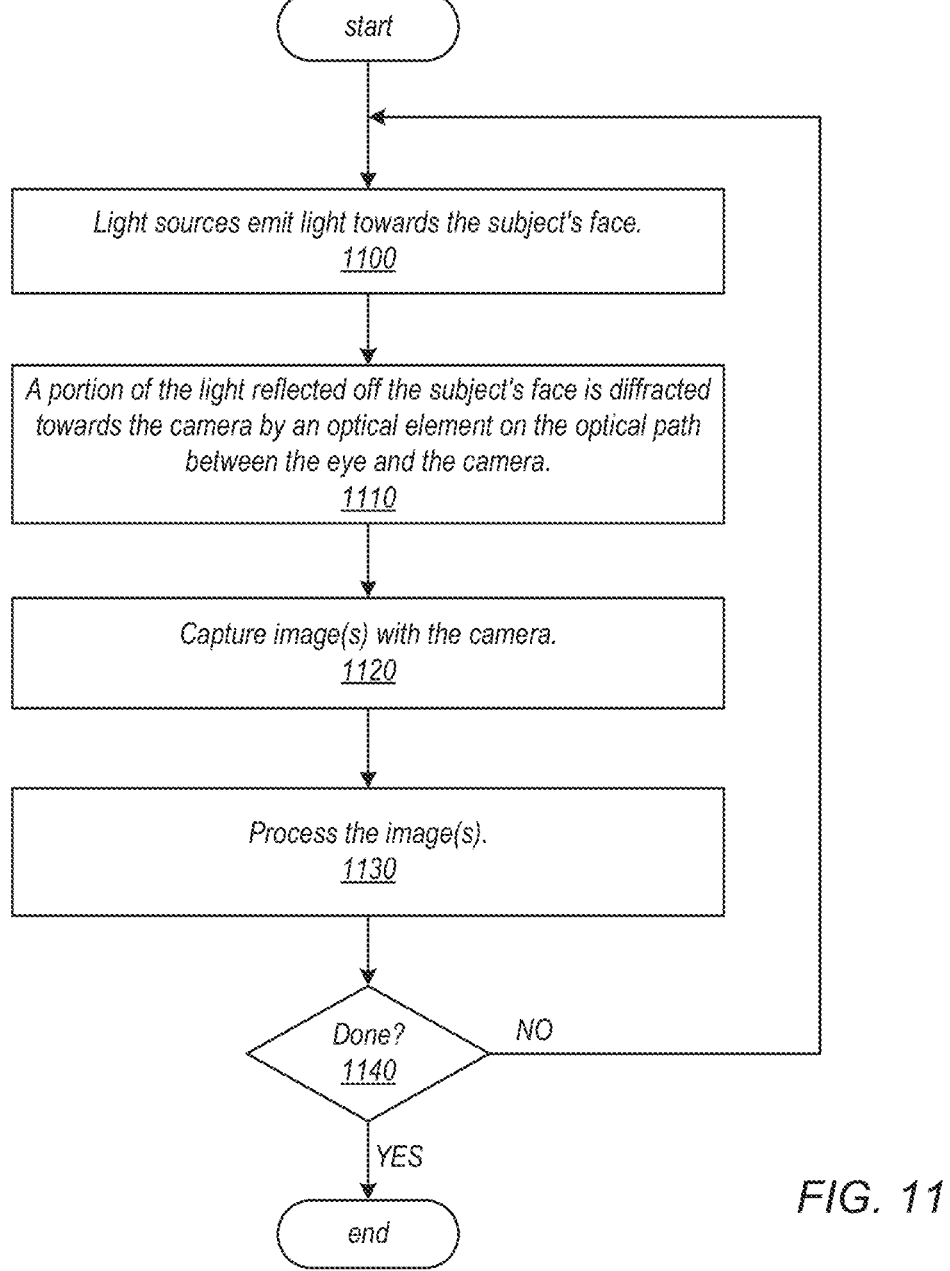
FIG. 11 is a flowchart of a method for capturing and processing images in a system that includes a diffractive optical element on the light path between the user's eye and the eye camera to improve the viewing angle of the camera, according to some embodiments.

FIG. 11 is a flowchart of a method for capturing and processing images in a system that includes a diffractive optical element on the light path between the user's eye and the eye camera to improve the viewing angle of the camera, according to some embodiments. As indicated at 1100, light sources (e.g., LEDs) emit light towards the subject's face. As indicated at 1110, a portion of the light reflected off the subject's face is diffracted towards the camera by an optical element on the optical path between the subject's eye and the camera. As indicated at 1120, one or more images are captured by the camera. As indicated at 1130, the images are processed, for example by a biometric authentication algorithm on a controller of the device that includes the imaging system. At 1140, if processing is done, the method ends. Otherwise the method returns to element 1100.

Biometric Imaging System Using Multiple Wavelengths

Embodiments of methods and apparatus for biometric authentication and anti-spoofing are described in which two or more different wavelengths are used in the illumination system. In embodiments, the illumination source (e.g. a ring of LEDs) may be configured to emit light at two or more different wavelengths, either continuously or selectively. For example, in some embodiments, a wavelength in the mid-800 nm range may be used for biometric authentication using the iris, and a wavelength in the mid-900 mm range may be used for anti-spoofing. Anti-spoofing is related to biometric authentication in that "spoofing" refers to attempts to trick a biometric authentication system by, for example, presenting a picture or model of a valid user's eye, eye region, or face as an attempt to "spoof" the biometric authentication system.

In some embodiments, a method may be implemented in which a first wavelength is emitted by the illumination source for capturing an image or images for a first portion of algorithmic processing for biometric authentication, and a second wavelength is emitted by the illumination source for capturing another image or images for a second portion of algorithmic processing for biometric authentication. In some embodiments, a camera may sequentially capture two or more images at different wavelengths. As an alternative, in some embodiments, a camera may be configured to concurrently capture two or more images at different wavelengths.

Figure 12A:
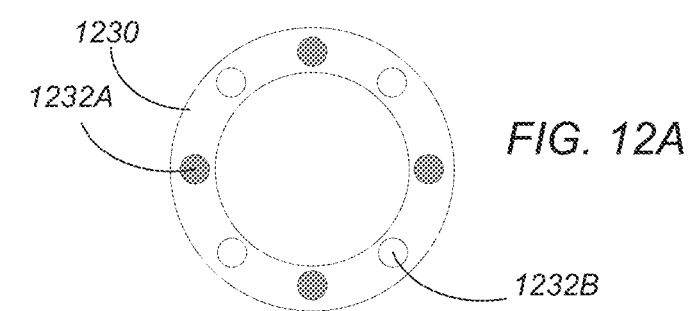
FIGS. 12A through 12C illustrate a system that includes light sources that emit light at multiple wavelengths to sequentially capture images at the multiple wavelengths, according to some embodiments.
Figure 12B:
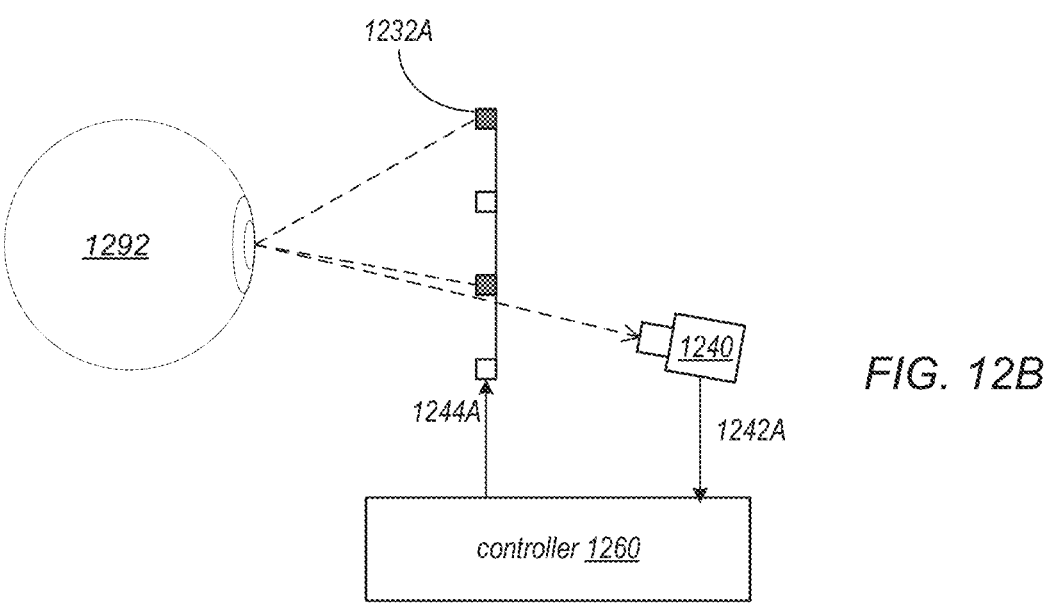
Figure 12C:
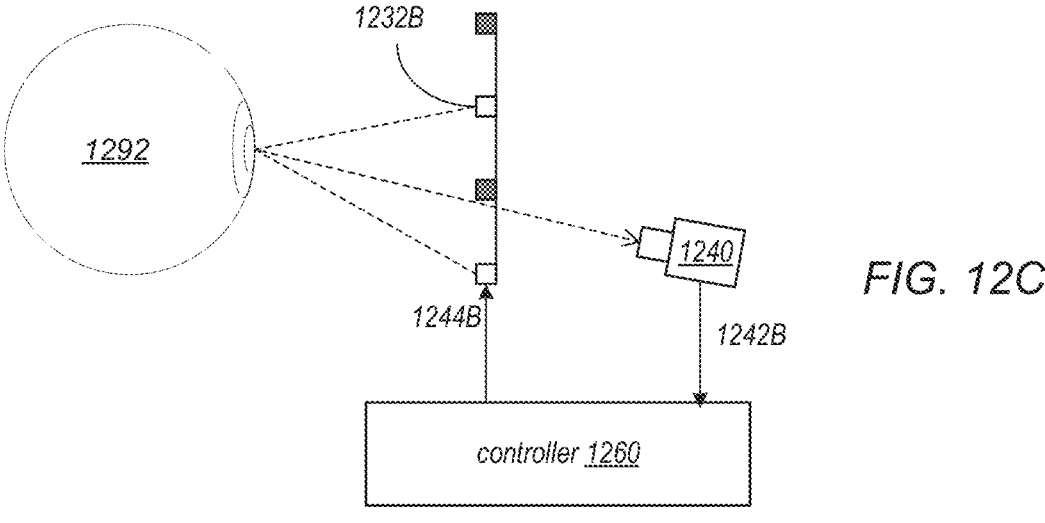

FIGS. 12A through 12C illustrate a system that includes light sources that emit light at multiple wavelengths to sequentially capture images at the multiple wavelengths, according to some embodiments.

FIG. 12A shows an example illumination source 1230 that includes multiple LEDs 1232. In this example, there are eight LEDs 1232 arranged in a ring. Note, however, that the number and arrangement of the LEDS 1232 in an illumination source 1230 may be different. In addition, in some embodiments other light-emitting elements than LEDs may be used. In some embodiments, some of the LEDs 1232A, represented by the shaded circles, may be configured to emit light at a first wavelength in the IR (including SWIR or NIR) range, for example at 740, 750, 840, 850, 940, or 950 nanometers. The other LEDs 1232B, represented by the white circles, may be configured to emit light at a different wavelength in the IR (including SWIR or NIR) range. Note that, in some embodiments, more than two wavelengths may be used. Further, in some embodiments, individual lighting elements may be configured to selectively emit light at two or more different wavelengths.

FIGS. 12B and 12C illustrate an example imaging system that includes light sources (e.g., LEDs) that emit light at multiple wavelengths, according to some embodiments. The imaging system may include, but is not limited to, one or more cameras 1240, an illumination source 1230, and a controller 1260. In this example, the eye camera 1240 is pointed towards the eye 1292 to receive reflected light from the illumination source 1230. However, in some embodiments, the eye camera 1240 may instead or also capture images of the periorbital region and portions of the face. Note that in some embodiments, the eye camera 1240 may image a reflection off a hot mirror as shown in FIG. 1B. Further, in some embodiments, the eye camera 1240 may image the eye 1292 through one or more intermediate optical elements as shown in FIG. 1C.

In FIG. 12A, the eye camera(s) 1240 may capture 1242A individual images of the eye 1292 with LEDS 1232A illuminating the eye at a first wavelength under control 1244A of the controller 1260. In FIG. 12B, the eye camera (s) 1240 may capture 1242B individual images of the eye 1292 with LEDS 1232B illuminating the eye at a second wavelength under control 1244B of the controller 1260.

The captured images may be processed by controller 1260 to analyze the quality of one or more of the biometric aspects captured in the images. Depending on the particular application, the controller 1260 may select a best biometric aspect or feature from the images to be used for biometric authentication, or may select two or more biometric aspects or features to be used in combination for biometric authentication.

In some embodiments, the first wavelength may be emitted by the illumination source 1230 for capturing an image or images for a first portion of algorithmic processing for biometric authentication, and the second wavelength may be emitted by the illumination source 1230 for capturing another image or images for a second portion of algorithmic processing for biometric authentication. In some embodiments, the first wavelength may be used to capture images (e.g., of the iris) for use in an anti-spoofing process, and the second wavelength may be used to capture images (e.g., of the iris) for use in biometric authentication.

Figure 13A:
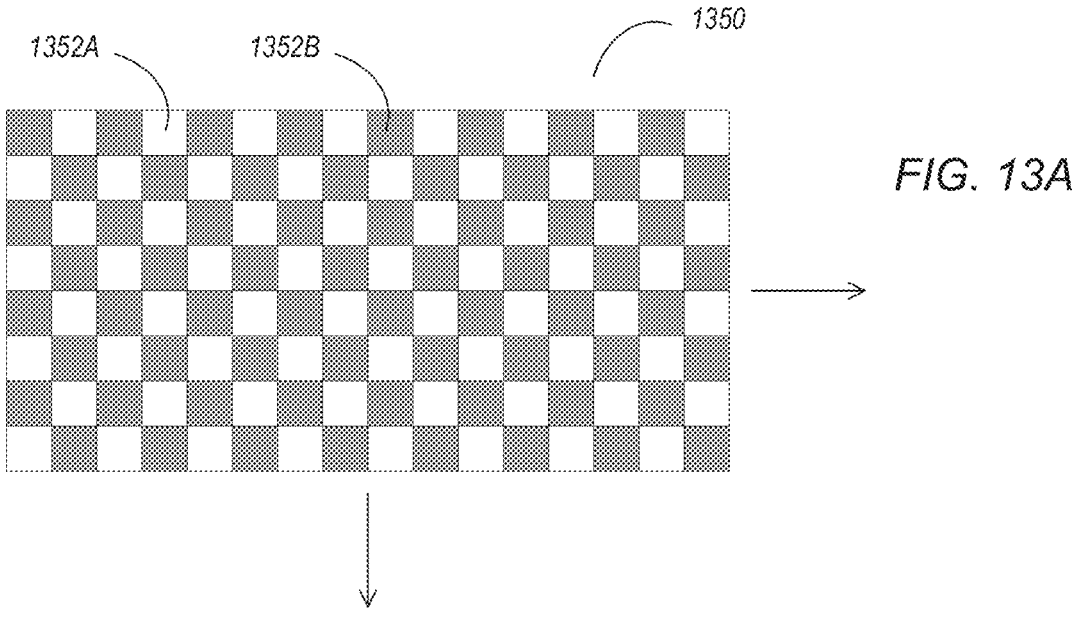
FIGS. 13A and 13B illustrate a system that includes a camera with a photosensor that concurrently captures multiple images at different wavelengths, according to some embodiments.
Figure 13B:
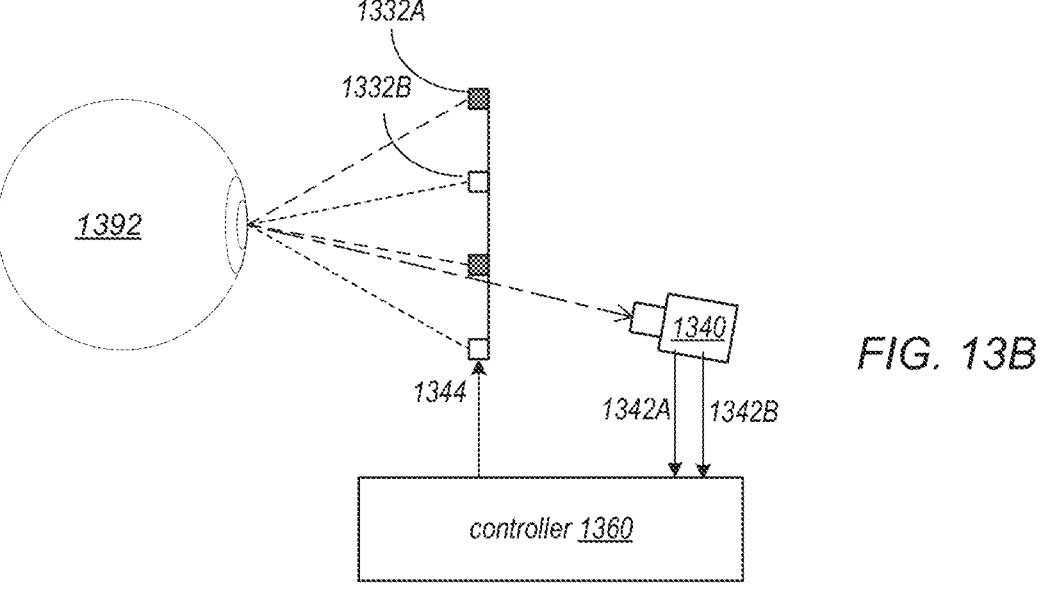

FIGS. 13A and 13B illustrate a system that includes a camera with a photosensor that concurrently captures multiple images at different wavelengths, according to some embodiments. As illustrated in FIG. 13A, in some embodiments, as an alternative to sequentially capturing images at different wavelengths, a camera sensor 1350 may be provided that is configured to concurrently capture two (or more) images at different wavelengths. In this example, every other pixel is configured to capture light at a particular wavelength. For example, the white pixels 1352A may be configured to capture light in the mid-800 nm range, and the shaded pixels may be configured to capture light in the mid-900 range. For example, individual filters may be applied to each pixel 1352, with a first filter applied to pixels 1352A and a second filter applied to pixels 1352B.

FIG. 13B illustrates an example imaging system that includes light sources (e.g., LEDs) that emit light at multiple wavelengths, and in which the camera includes a camera sensor 1350 that is configured to concurrently capture two (or more) images at different wavelengths, according to some embodiments. The imaging system may include, but is not limited to, one or more cameras 1340, an illumination source 1330, and a controller 1360. In this example, the eye camera 1340 is pointed towards the eye 1392 to receive reflected light from the illumination source 1330. However, in some embodiments, the eye camera 1340 may instead or also capture images of the periorbital region and portions of the face. Note that in some embodiments, the eye camera 1340 may image a reflection off a hot mirror as shown in FIG. 1B. Further, in some embodiments, the eye camera 1340 may image the eye 1392 through one or more intermediate optical elements as shown in FIG. 1C. The illumination source 1330 may be configured to emit light at multiple wavelengths, for example as illustrated in FIG. 12A. The eye camera(s) 1340 may concurrently capture at least two images 1342A and 1342B of the eye 1392 at the multiple wavelengths using a sensor 1350 as illustrated in FIG. 13A with LEDS 1332A and 1332B concurrently illuminating the eye 1392 at both wavelengths under control 1344 of the controller 1360.

Figure 14:
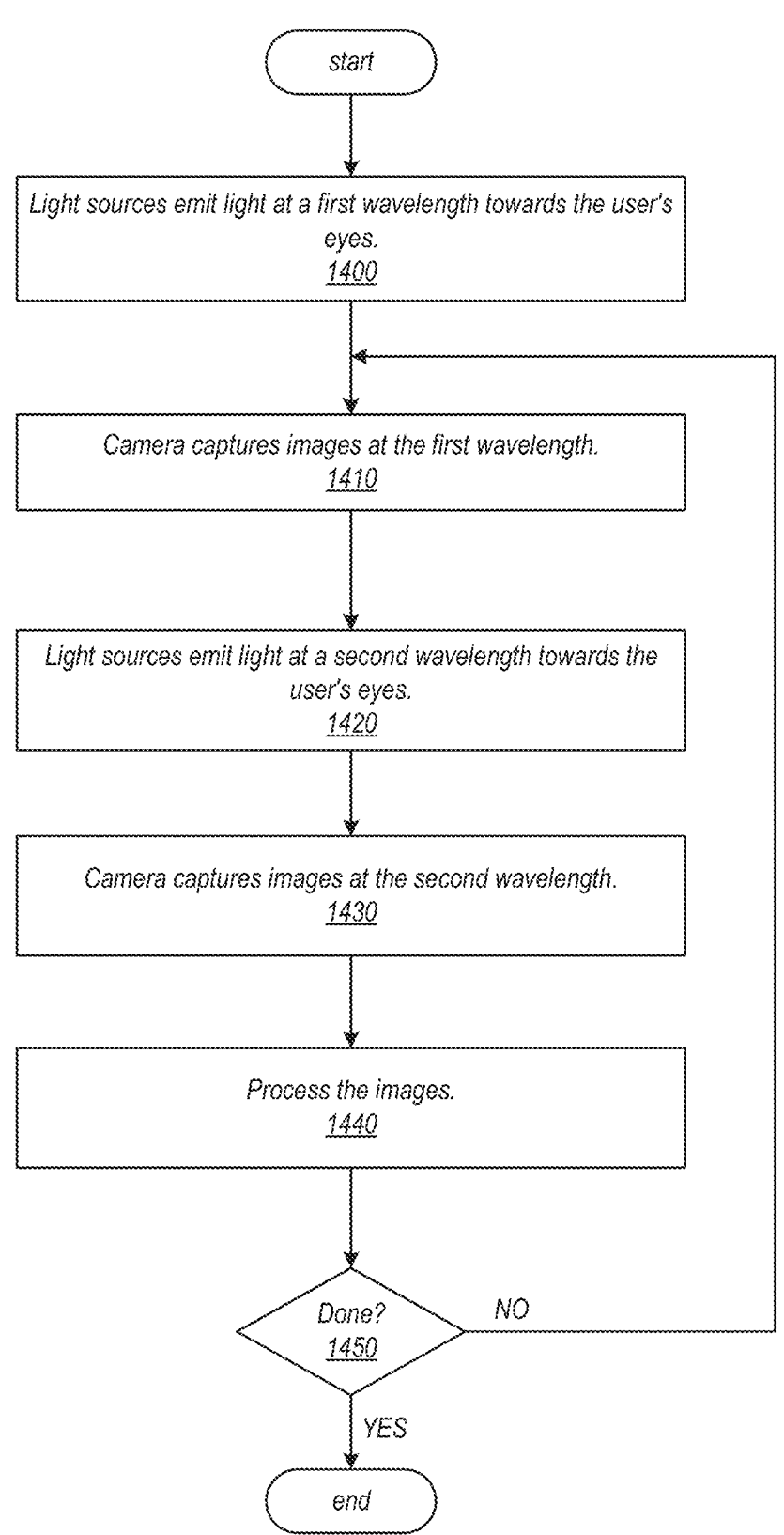
FIG. 14 is a flowchart of a method for sequentially capturing and processing images at multiple wavelengths, according to some embodiments.

FIG. 14 is a flowchart of a method for sequentially capturing and processing images at multiple wavelengths, according to some embodiments. As indicated at 1400, light sources emit light at a first wavelength towards the user's eyes. As indicated at 1410, the camera captures images at the first wavelength. As indicated at 1420, the light sources emit light at a second wavelength towards the user's eyes. As indicated at 1430, the camera captures images at the second wavelength. As indicated at 1440, the images are processed. At 1450, if the method is not done, then the method returns to element 1410. Otherwise, the method ends.

Figure 15:
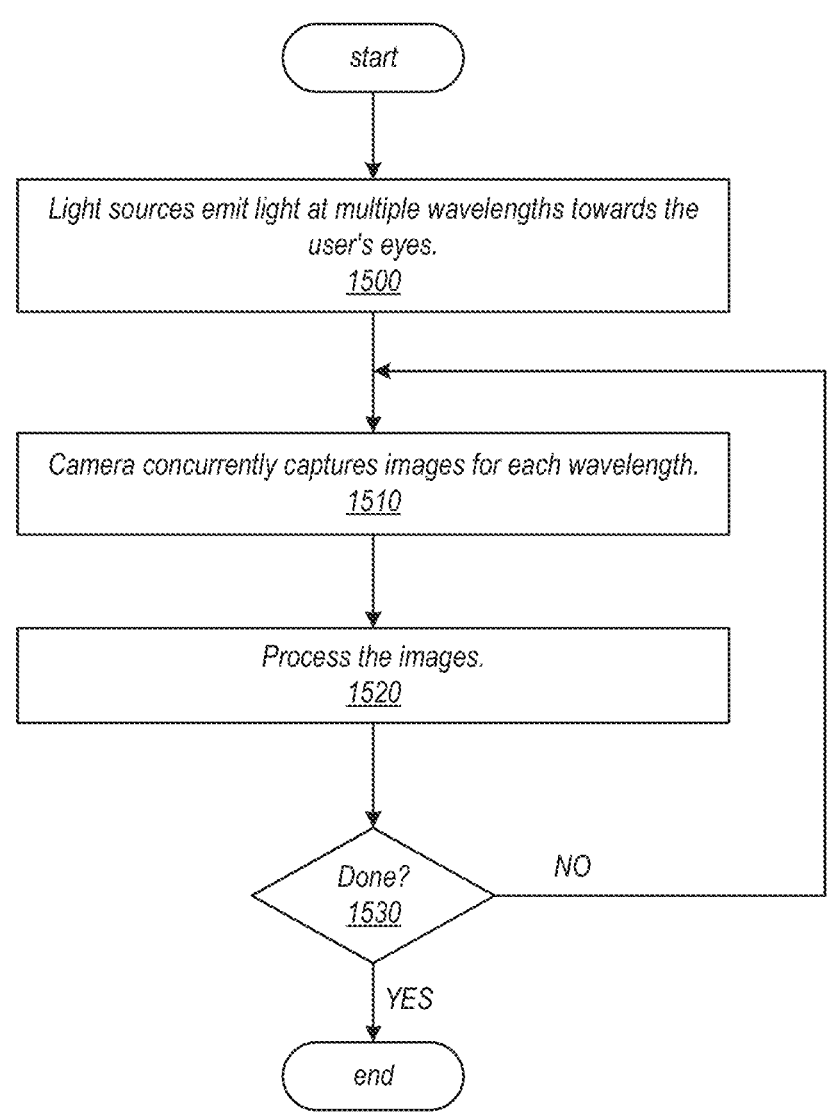
FIG. 15 is a flowchart of a method for concurrently capturing and processing images at multiple wavelengths, according to some embodiments.

FIG. 15 is a flowchart of a method for concurrently capturing and processing images at multiple wavelengths, according to some embodiments. As indicated at 1500, light sources emit light at multiple wavelengths towards the user's eyes. As indicated at 1510, the camera concurrently captures images for each wavelength, for example using a photosensor 1350 as illustrated in FIG. 13A. As indicated at 1520, the images are processed. At 1530, if the method is not done, then the method returns to element 1510. Otherwise, the method ends.

Improving Eye Pose for Biometric Authentication

Embodiments of methods and apparatus for biometric authentication are described in which a current eye pose is determined and evaluated to determine if the current pose is satisfactory, and in which the eye pose may be improved by the user manually adjusting the device or their pose/gaze direction in response to a signal from the controller, and/or in which the imaging system is mechanically adjusted at the direction of the controller to improve the current view of the eye.

In embodiments, a method executed on the controller may identify the user's current eye location and/or orientation (pose), for example by capturing and evaluating one or more images of the eye(s). The controller may then evaluate how beneficial the current pose is for biometric authentication. In some embodiments, the controller may provide feedback to the user to prompt the user to adjust their pose (e.g., by changing the direction of their gaze) or to manually adjust the device (e.g., by manually moving the device's position in relation to their eyes). In some embodiments, instead or in addition to prompting the user to manually adjust their pose or the device, the controller may direct the imaging system hardware to mechanically adjust the imaging system, for example by slightly moving or tilting the camera, or by zooming in or out. Adjusting the pose of the user with respect to the imaging system manually or mechanically may ensure a desired level biometric authentication performance, as better images of the eye or eye region may be captured. Feedback to the user may be a haptic, audio, or visual signal, or a combination of two or more haptic, audio, or visual signals. The automatic adjustment of the imaging system directed by the controller may move a component or a combination of components, for example a module that includes at least the camera. The manual or automatic adjustments may be a single step in the biometric authentication process, or alternatively may be performed in a control loop until certain qualities or objective criteria are achieved in the captured images.

Figure 16:
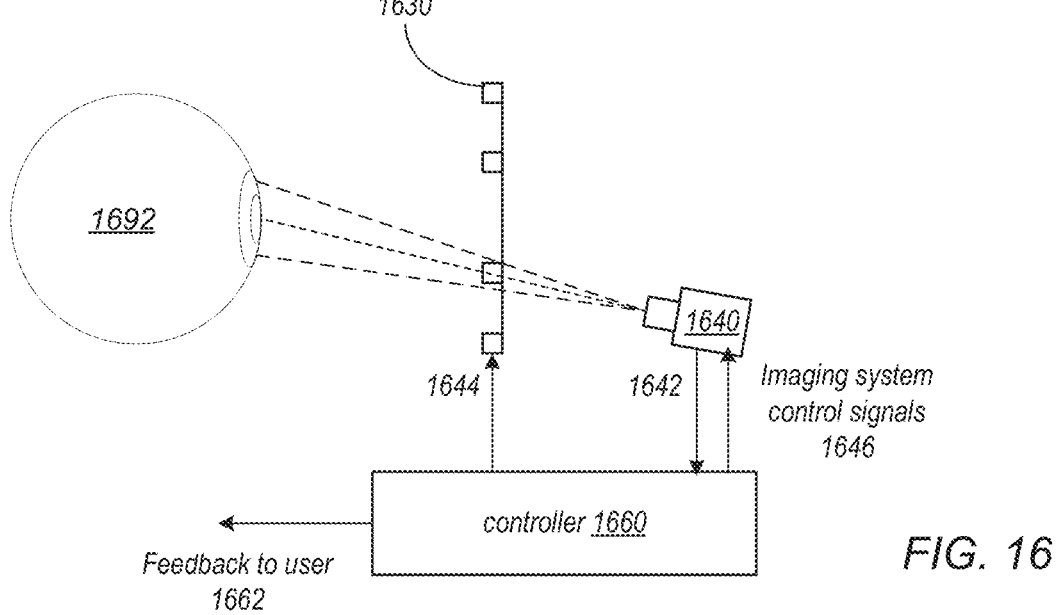
FIG. 16 illustrates a system that provides feedback to the user and/or control signals to the imaging system to manually or mechanically adjust the viewing angle of the camera with respect to the user's eye or periocular region, according to some embodiments.

FIG. 16 illustrates a system that provides feedback to the user and/or control signals to the imaging system to manually or mechanically adjust the viewing angle of the camera with respect to the user's eye or periocular region, according to some embodiments. The imaging system may include, but is not limited to, one or more cameras 1640, an illumination source 1630, and a controller 1660. In this example, the eye camera 1640 is pointed towards the eye 1692 to receive reflected light from the illumination source 1630. However, in some embodiments the eye camera 1640 may instead or also capture images of the periorbital region and/or portions of the face. Note, however, in some embodiments, the eye camera 1640 may image a reflection off a hot mirror as shown in FIG. 1B. Further, in some embodiments, the eye camera 1640 may image the user's eye 1692 through one or more intermediate optical elements as shown in FIG. 1C. The eye camera(s) 1640 may capture 1642 one or more images of the user's eye 1692. The captured image(s) may be processed by controller 1660 to determine a current eye pose and to determine if the current eye pose is satisfactory for the biometric authentication process. If the eye pose is not satisfactory, then the controller 1660 may provide feedback 1662 to the user to prompt the user to change their eye pose and/or to manually adjust the device. In some embodiments, instead of or in addition to the feedback 1662, the controller 1660 may signal 1646 the imaging system to mechanically adjust the imaging system, for example by moving or tilting the camera 1640.

Figure 17:
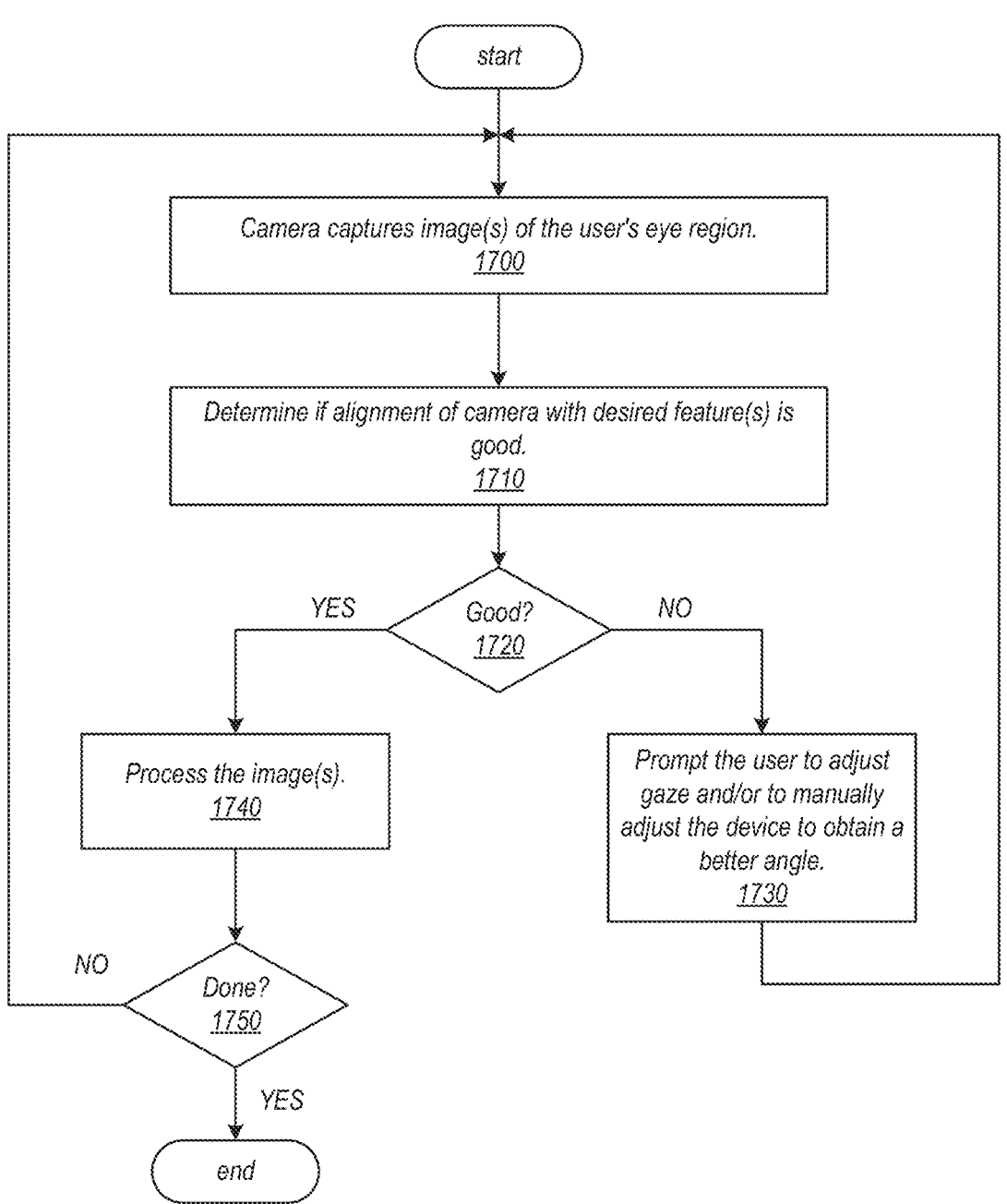
FIG. 17 is a flowchart of a method for providing feedback to the user to manually adjust the viewing angle of the camera with respect to the user's eye or periocular region, according to some embodiments.

FIG. 17 is a flowchart of a method for providing feedback to the user to manually adjust the viewing angle of the camera with respect to the user's eye or periocular region, according to some embodiments. The method may, for example, be performed in a biometric authentication process. As indicated at 1700, the camera captures image(s) of the user's eye region. As indicated at 1710, the controller determines from the image(s) if the alignment of the camera with the desired feature(s) is good. At 1720, if the alignment is not good, the controller may prompt the user to adjust the gaze and/or to manually adjust the device to obtain a better viewing angle, and the method returns to element 1700. At 1720, if the alignment is good, then one or more image(s) may be processed as indicated at 1740. At 1750, if not done processing, then the method returns to 1700. Otherwise, the method is done.

Figure 18:
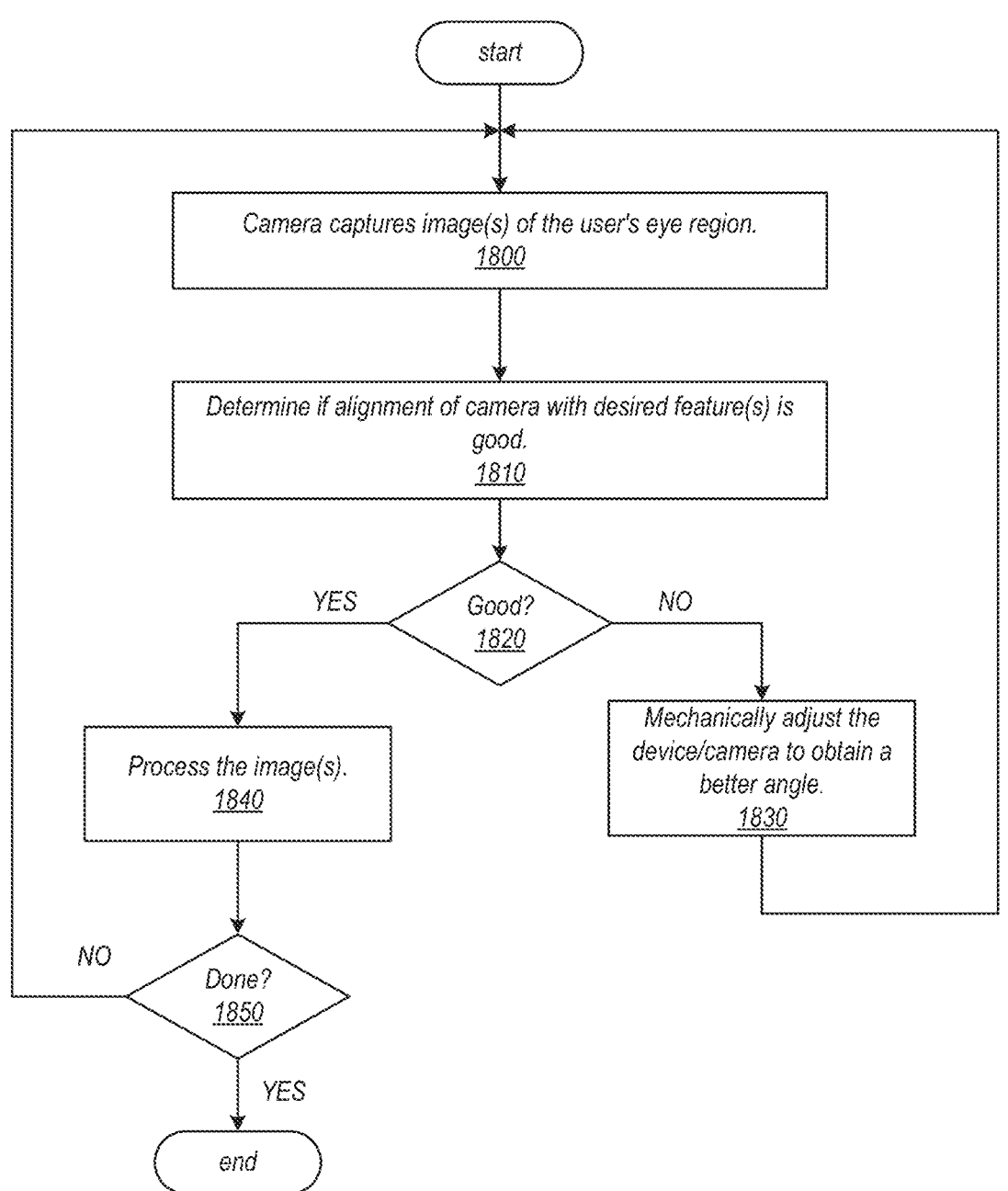
FIG. 18 is a flowchart of a method for providing control signals to the imaging system to mechanically adjust the viewing angle of the camera with respect to the user's eye or periocular region, according to some embodiments.

FIG. 18 is a flowchart of a method for providing control signals to the imaging system to mechanically adjust the viewing angle of the camera with respect to the user's eye or periocular region, according to some embodiments. The method may, for example, be performed in a biometric authentication process. As indicated at 1800, the camera captures image(s) of the user's eye region. As indicated at 1810, the controller determines from the image(s) if the alignment of the camera with the desired feature(s) is good. At 1820, if the alignment is not good, the controller may signal the imaging system to mechanically adjust the device/camera to obtain a better viewing angle, and the method returns to element 1800. At 1820, if the alignment is good, then one or more image(s) may be processed as indicated at 1840. At 1850, if not done processing, then the method returns to 1800. Otherwise, the method is done.

Example Systems

Figures 19A, 19B:
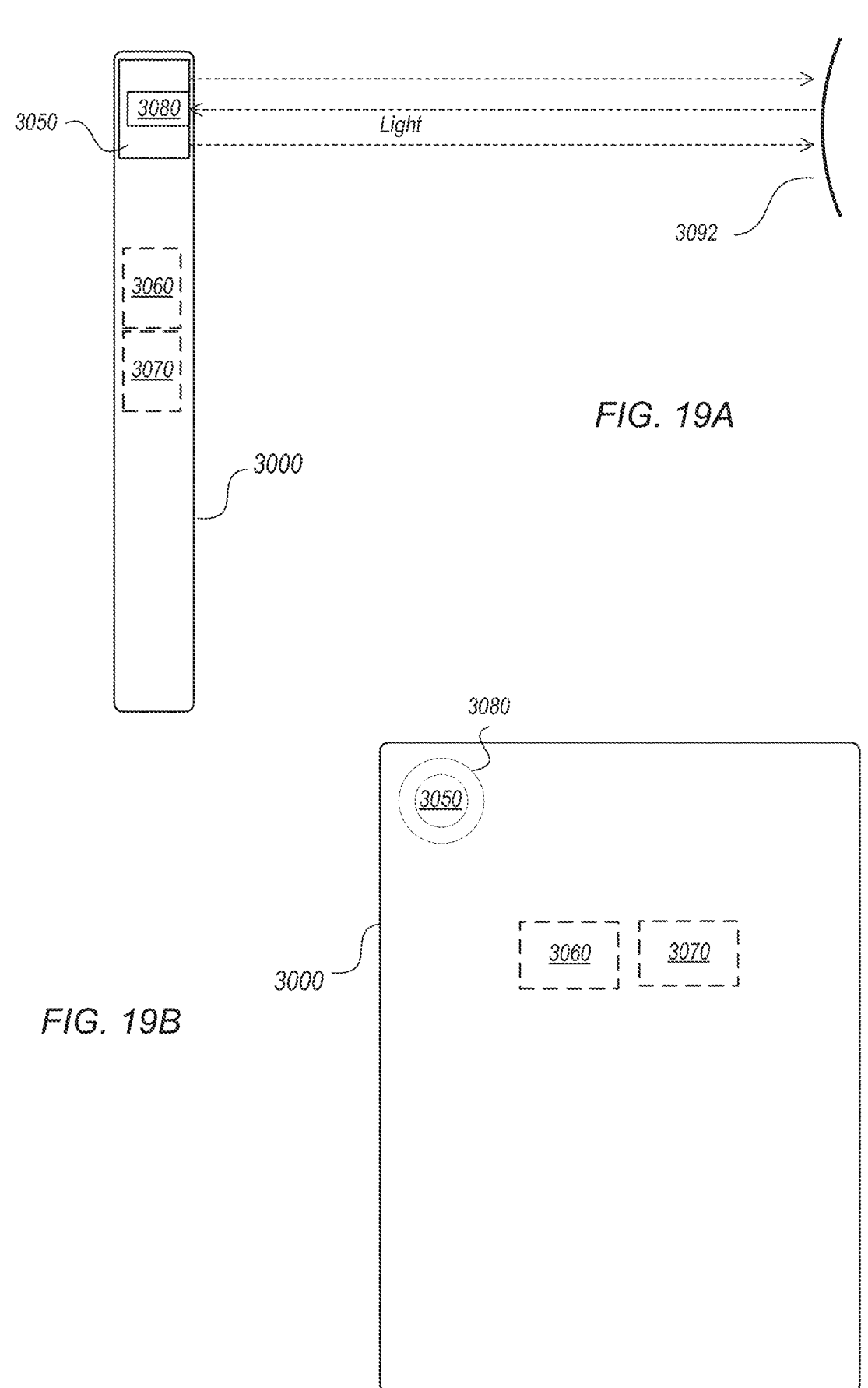
FIGS. 19A and 19B are block diagrams illustrating a device that may include components and implement methods as illustrated in FIGS. 1 through 18, according to some embodiments.

FIGS. 19A and 19B are block diagrams illustrating a device that may include components and implement methods as illustrated in FIGS. 1 through 18, according to some embodiments. An example application of the methods for improving the performance of imaging systems used in biometric authentication processes as described herein is in a handheld device 3000 such as smartphone, pad, or tablet. FIG. 19A shows a side view of an example device 3000, and FIG. 19B shows an example top view of the example device 3000. Device 3000 may include, but is not limited to, a display screen (not shown), a controller 3060 comprising one or more processors, memory 3070, pose, motion, and orientation sensors (not shown), and one or more cameras or sensing devices such as visible light cameras and depth sensors (not shown). A camera 3080 and illumination source 3040 as described herein may be attached to or integrated in the device 3000, and the device 3000 may be held and positioned by the user so that the camera 3080 can capture image(s) of the user's eye or eye region while illuminated by the illumination source 3050. The captured images may, for example, be processed by controller 3060 to authenticate the person, for example via an iris authentication process.

Note that device 3000 as illustrated in FIGS. 19A and 19B is given by way of example, and is not intended to be limiting. In various embodiments, the shape, size, and other features of a device 3000 may differ, and the locations, numbers, types, and other features of the components of a device 3000 may vary.

Figure 20:
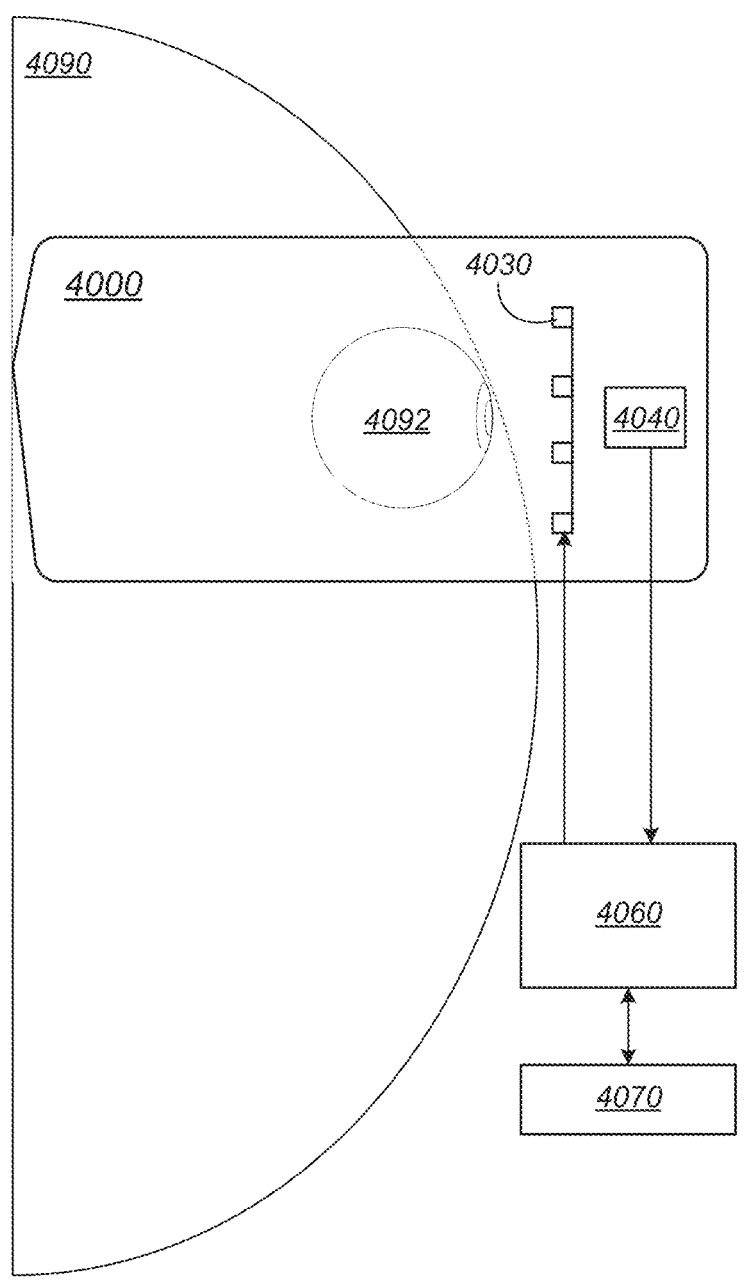
FIG. 20 illustrates an example head-mounted device (HMD) that may include components and implement methods as illustrated in FIGS. 1 through 18, according to some embodiments.

FIG. 20 illustrates an example head-mounted device (HMD) that may include components and implement methods as illustrated in FIGS. 1 through 18, according to some embodiments. The HMD 4000 may, for example be a component in a mixed or augmented reality (MR) system. Note that HMD 4000 as illustrated in FIG. 20 is given by way of example, and is not intended to be limiting. In various embodiments, the shape, size, and other features of an HMD 4000 may differ, and the locations, numbers, types, and other features of the components of an HMD 4000 may vary. In some embodiments, HMD 4000 may include, but is not limited to, a display and two optical lenses (eyepieces) (not shown), mounted in a wearable housing or frame. As shown in FIG. 20, HMD 4000 may be positioned on the user's head 4090 such that the display and eyepieces are disposed in front of the user's eyes 4092. The user looks through the eyepieces 4020 onto the display. HMD 4000 may also include sensors that collect information about the user's environment (video, depth information, lighting information, etc.) and about the user (e.g., eye tracking sensors). The sensors may include, but are not limited to one or more eye cameras 4040 (e.g., infrared (IR) cameras) that capture views of the user's eyes 4092, one or more scene (visible light) cameras (e.g., RGB video cameras) that capture images of the real world environment in a field of view in front of the user (not shown), and one or more ambient light sensors that capture lighting information for the environment (not shown).

Figure 21:
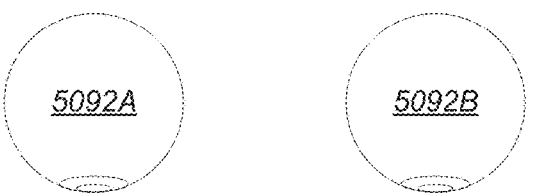
FIG. 21 is a block diagram illustrating an example system that may include components and implement methods as illustrated in FIGS. 1 through 18, according to some embodiments.
Figure 21:
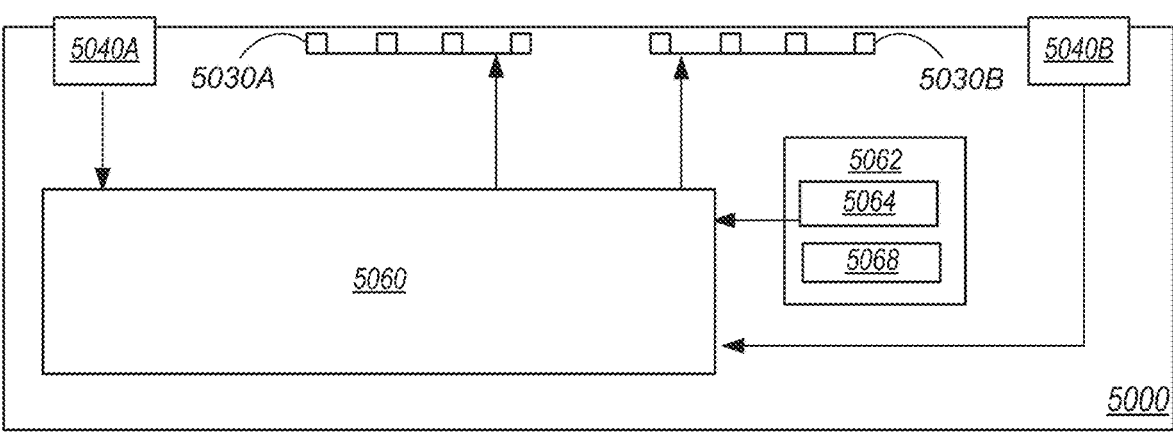

A controller 4060 for the MR system may be implemented in the HMD 4000, or alternatively may be implemented at least in part by an external device (e.g., a computing system) that is communicatively coupled to HMD 4000 via a wired or wireless interface. Controller 4060 may include one or more of various types of processors, image signal processors (ISPs), graphics processing units (GPUs), coder/decoders (codecs), and/or other components for processing and rendering video and/or images. Controller 4060 may render frames (each frame including a left and right image) that include virtual content based at least in part on inputs obtained from the sensors, and may provide the frames to the display. FIG. 21 further illustrates components of an HMD and MR system, according to some embodiments.

In some embodiments, an imaging system for the MR system may include, but is not limited to, one or more eye cameras 4040 and an IR light source 4030. IR light source 4030 (e.g., IR LEDs) may be positioned in the HMD 4000 (e.g., around the eyepieces 4020, or elsewhere in the HMD 4000) to illuminate the user's eyes 4092 with IR light. At least one eye camera 4040 (e.g., an IR camera, for example a 400×400 pixel count camera or a 600×600 pixel count camera, that operates at 850 nm or 940 nm, or at some other IR wavelength or combination of wavelengths, and that captures frames, for example at a rate of 60-120 frames per second (FPS)), is located at each side of the user 4090's face. In various embodiments, the eye cameras 4040 may be positioned in the HMD 4000 on each side of the user 4090's face to provide a direct view of the eyes 4092, a view of the eyes 4092 through the eyepieces 4020, or a view of the eyes 4092 via reflection off hot mirrors or other reflective components. Note that the location and angle of eye camera 4040 is given by way of example, and is not intended to be limiting. While FIG. 20 shows a single eye camera 4040 located on each side of the user 4090's face, in some embodiments there may be two or more eye cameras 4040 on each side of the user 4090's face.

A portion of IR light emitted by light source(s) 4030 reflects off the user 4090's eyes and is captured by the eye cameras 4040 to image the user's eyes 4092. Images captured by the eye cameras 4040 may be analyzed by controller 4060 to detect features (e.g., pupil), position, and movement of the user's eyes 4092, and/or to detect other information about the eyes 4092 such as pupil dilation. For example, the point of gaze on the display may be estimated from the eye tracking; the estimated point of gaze may be used to cause the scene camera(s) of the HMD 4000 to expose images of a scene based on a region of interest (ROI) corresponding to the point of gaze As another example, the estimated point of gaze may enable gaze-based interaction with content shown on the display. As another example, in some embodiments, brightness of the displayed images may be modulated based on the user's pupil dilation as determined by the imaging system. The HMD 4000 may implement one or more of the methods for improving the performance of the imaging systems used in biometric authentication or gaze tracking processes as illustrated in FIGS. 1 through 18 to capture and process images of the user's eyes 4090.

Embodiments of an HMD 4000 as illustrated in FIG. 20 may, for example, be used in augmented or mixed (AR) applications to provide augmented or mixed reality views to the user 4090. HMD 4000 may include one or more sensors, for example located on external surfaces of the HMD 4000, which collect information about the user 4090's external environment (video, depth information, lighting information, etc.); the sensors may provide the collected information to controller 4060 of the MR system. The sensors may include one or more visible light cameras (e.g., RGB video cameras) that capture video of the user's environment that may be used to provide the user 4090 with a virtual view of their real environment. In some embodiments, video streams of the real environment captured by the visible light cameras may be processed by the controller 4060 of the HMD 4000 to render augmented or mixed reality frames that include virtual content overlaid on the view of the real environment, and the rendered frames may be provided to the HMD 4000's display system.

FIG. 21 is a block diagram illustrating an example MR system that may include components and implement methods as illustrated in FIGS. 1 through 18, according to some embodiments. In some embodiments, a MR system may include an HMD 5000 such as a headset, helmet, goggles, or glasses. HMD 5000 may implement any of various types of display technologies. For example, the HMD 5000 may include a display system that displays frames including left and right images on screens or displays (not shown) that are viewed by a user through eyepieces (not shown). The display system may, for example, be a DLP (digital light processing), LCD (liquid crystal display), or LCoS (liquid crystal on silicon) technology display system. To create a three-dimensional (3D) effect in a 3D virtual view, objects at different depths or distances in the two images may be shifted left or right as a function of the triangulation of distance, with nearer objects shifted more than more distant objects. Note that other types of display systems may be used in some embodiments.

In some embodiments, HMD 5000 may include a controller 5060 configured to implement functionality of the MR system and to generate frames (each frame including a left and right image) that are provided to the HMD's displays. In some embodiments, HMD 5000 may also include a memory 5062 configured to store software (code 5064) of the MR system that is executable by the controller 5060, as well as data 5068 that may be used by the MR system when executing on the controller 5060. In some embodiments, HMD 5000 may also include one or more interfaces (e.g., a Bluetooth technology interface, USB interface, etc.) configured to communicate with an external device via a wired or wireless connection. In some embodiments, at least a part of the functionality described for the controller 5060 may be implemented by the external device. The external device may be or may include any type of computing system or computing device, such as a desktop computer, notebook or laptop computer, pad or tablet device, smartphone, hand-held computing device, game controller, game system, and so on.

In various embodiments, controller 5060 may be a uni-processor system including one processor, or a multiprocessor system including several processors (e.g., two, four, eight, or another suitable number). Controller 5060 may include central processing units (CPUs) configured to implement any suitable instruction set architecture, and may be configured to execute instructions defined in that instruction set architecture. For example, in various embodiments controller 5060 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 5060 may employ any microarchitecture, including scalar, superscalar, pipelined, superpipelined, out of order, in order, speculative, non-speculative, etc., or combinations thereof. Controller 5060 may include circuitry to implement microcoding techniques. Controller 5060 may include one or more processing cores each configured to execute instructions. Controller 5060 may include one or more levels of caches, which may employ any size and any configuration (set associative, direct mapped, etc.). In some embodiments, controller 5060 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 5060 may include one or more other components for processing and rendering video and/or images, for example image signal processors (ISPs), coder/decoders (codecs), etc.

Memory 5062 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 5000 may include one or more sensors that collect information about the user's environment (video, depth information, lighting information, etc.). The sensors 500 may provide the information to the controller 5060 of the MR system. In some embodiments, the sensors may include, but are not limited to, visible light cameras (e.g., video cameras) and ambient light sensors.

HMD 5000 may be positioned on the user's head such that the displays and eyepieces are disposed in front of the user's eyes 5092A and 5092B. IR light sources 5030A and 5030B (e.g., IR LEDs) may be positioned in the HMD 5000 (e.g., around the eyepieces, or elsewhere in the HMD 5000) to illuminate the user's eyes 5092A and 5092B with IR light. Eye cameras 5040A and 5040B (e.g., IR cameras, for example 400×400 pixel count cameras or 600×600 pixel count cameras that operate at 850 nm or 940 nm, or at some other IR wavelength, and that capture frames, for example at a rate of 60-120 frames per second (FPS)), may be located at each side of the user's face. In various embodiments, the eye cameras 5040 may be positioned in the HMD 5000 to provide a direct view of the eyes 5092, a view of the eyes 5092 through the eyepieces 5020, or a view of the eyes 5092 via reflection off hot mirrors or other reflective components. Note that the location and angle of eye cameras 5040A and 5040B is given by way of example, and is not intended to be limiting. In some embodiments, there may be a single eye camera 5040 located on each side of the user's face. In some embodiments there may be two or more eye cameras 5040 on each side of the user's face. For example, in some embodiments, a wide-angle camera 5040 and a narrower-angle camera 5040 may be used on each side of the user's face. A portion of IR light emitted by light sources 5030A and 5030B reflects off the user's eyes 5092A and 5092B is received at respective eye cameras 5040A and 5040B, and is captured by the eye cameras 5040A and 5040B to image the user's eyes 5092A and 5092B. Eye information captured by the cameras 5040A and 5040B may be provided to the controller 5060. The controller 5060 may analyze the eye information (e.g., images of the user's eyes 5092A and 5092B) to determine eye position and movement and/or other features of the eyes 5092A and 5092B. In some embodiments, to accurately determine the location of the user's eyes 5092A and 5092B with respect to the eye cameras 5040A and 5040B, the controller 5060 may perform a 3D reconstruction using images captured by the eye cameras 5040A and 5040B to generate 3D models of the user's eyes 5092A and 5092B. The 3D models of the eyes 5092A and 5092B indicate the 3D position of the eyes 5092A and 5092B with respect to the eye cameras 5040A and 5040, which allows eye tracking algorithms executed by the controller to accurately track eye movement. The HMD 4000 may implement one or more of the methods for improving the performance of the imaging systems used in biometric authentication or gaze tracking processes as illustrated in FIGS. 1 through 18 to capture and process images of the user's eyes 4090.

The eye information obtained and analyzed by the controller 5060 may be used by the controller in performing various VR or AR system functions. For example, the point of gaze on the displays may be estimated from images captured by the eye cameras 5040A and 5040B; the estimated point of gaze may be used to cause the scene camera(s) of the HMD 5000 to expose images of a scene based on a region of interest (ROI) corresponding to the point of gaze. As another example, the estimated point of gaze may enable gaze-based interaction with virtual content shown on the displays. As another example, in some embodiments, brightness of the displayed images may be modulated based on the user's pupil dilation as determined by the imaging system.

In some embodiments, the HMD 5000 may be configured to render and display frames to provide an augmented or mixed reality (MR) view for the user based at least in part according to sensor inputs. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by MR system and composited with the displayed view of the user's real environment.

Embodiments of the HMD 5000 as illustrated in FIG. 21 may also be used in virtual reality (VR) applications to provide VR views to the user. In these embodiments, the controller 5060 of the HMD 5000 may render or obtain virtual reality (VR) frames that include virtual content, and the rendered frames may be displayed to provide a virtual reality (as opposed to mixed reality) experience to the user. In these systems, rendering of the VR frames may be affected based on the point of gaze determined from the imaging system.

Extended Reality

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

The following clauses provide descriptions of example embodiments of the techniques described above:

Clause 1. A system, comprising:

a camera configured to capture images of an eye region of a user; and a controller comprising one or more processors configured to:

determine and evaluate a current eye pose of the user, wherein the eye pose indicates a current eye location and orientation with respect to the camera;

determine based on the evaluation that the current eye pose is not satisfactory for capturing images to be used in a biometric authentication process;

signal the user to adjust their eye pose to improve a viewing angle of the camera with respect to the eye region; and perform biometric authentication for the user based on one or more images of the eye region of the user captured by the camera subsequent to the user adjusting their eye pose in response to the signal.

Clause 2. The system as recited in clause 1, wherein the signal comprises one or more of a haptic signal, an audio signal, and a visual signal.

Clause 3. The system as recited in clause 1, further comprising a display located in front of the user's eyes, and wherein the signal includes a visual indication on the display.

Clause 4. The system as recited in clause 1, wherein said determine and evaluate a current eye pose of the user, said determine that the current eye pose is not satisfactory for capturing images to be used in a biometric authentication process, and said signal the user to adjust their eye pose to improve a viewing angle of the camera with respect to the eye region are iteratively performed until a satisfactory eye pose is detected.

Clause 5. The system as recited in clause 1, wherein, to determine and evaluate a current eye pose of the user, the controller is configured to analyze one or more images of the eye region captured by the camera to determine if one or more objective criteria with regard to the eye region are achieved in the captured images.

Clause 6. The system as recited in clause 5, wherein the objective criteria include one or more of gaze direction, exposure, contrast, shadows, edges, undesirable streaks, occlusions, sharpness, uniformity of illumination, and undesired reflections.

Clause 7. The system as recited in clause 1, wherein the eye region includes one or more of an iris, an eye, a periorbital region, and a portion of the user's face.

Clause 8. The system as recited in clause 1, wherein, to perform biometric authentication for the user based on one or more images of the eye region of the user captured by the camera subsequent to the user adjusting their eye pose in response to the signal, the controller is configured to:

analyze quality of one or more biometric aspects captured in the one or more images according to one or more objective criteria;

select at least one biometric aspect according to the analysis; and perform the biometric authentication process based at least in part on the selected at least one biometric aspect.

Clause 9. The system as recited in clause 8, wherein the objective criteria include one or more of exposure, contrast, shadows, edges, undesirable streaks, occluding objects, sharpness, uniformity of illumination, and undesired reflections.

Clause 10. The system as recited in clause 8, wherein the biometric aspects include one or more of an eye surface, eye veins, eyelids, eyebrows, skin features, nose features, and iris features, wherein the iris features include one or more of colors, patterns, and musculature.

Clause 11. The system as recited in clause 1, further comprising an illumination source comprising a plurality of light-emitting elements configured to emit light towards the eye region to be imaged by the camera.

Clause 12. The system as recited in clause 11, wherein the light-emitting elements include light-emitting diodes (LEDs).

Clause 13. The system as recited in clause 11, wherein the light-emitting elements include infrared (IR) light sources, and wherein the camera is an infrared camera.

Clause 14. The system as recited in clause 1, wherein the system is a component of a head-mounted device (HMD), a handheld device, or a wall-mounted device.

Clause 15. A system, comprising:

a camera configured to capture images of an eye region of a user; and a controller comprising one or more processors configured to:

determine and evaluate a current eye pose of the user, wherein the eye pose indicates a current eye location and orientation with respect to the camera;

determine based on the evaluation that the current eye pose is not satisfactory for capturing images to be used in a biometric authentication process;

signal the camera to adjust a viewing angle of the camera with respect to the eye region; and perform biometric authentication for the user based on one or more images of the eye region of the user captured by the camera subsequent to adjusting the viewing angle in response to the signal.

Clause 16. The system as recited in clause 15, wherein said determine and evaluate a current eye pose of the user, said determine that the current eye pose is not satisfactory for capturing images to be used in a biometric authentication process, and said signal the camera to adjust a viewing angle of the camera with respect to the eye region are iteratively performed until a satisfactory eye pose is detected.

Clause 17. The system as recited in clause 15, wherein, to determine and evaluate a current eye pose of the user, the controller is configured to analyze one or more images of the eye region captured by the camera to determine if one or more objective criteria with regard to the eye region are achieved in the captured images.

Clause 18. The system as recited in clause 17, wherein the objective criteria include one or more of gaze direction, exposure, contrast, shadows, edges, undesirable streaks, occlusions, sharpness, uniformity of illumination, and undesired reflections.

Clause 19. The system as recited in clause 15, wherein the eye region includes one or more of an iris, an eye, a periorbital region, and a portion of the user's face.

Clause 20. The system as recited in clause 15, wherein, to perform biometric authentication for the user based on one or more images of the eye region of the user captured by the camera subsequent to the camera adjusting the viewing angle in response to the signal, the controller is configured to:

analyze quality of one or more biometric aspects captured in the one or more images according to one or more objective criteria;

select at least one biometric aspect according to the analysis; and perform the biometric authentication process based at least in part on the selected at least one biometric aspect.

Clause 21. The system as recited in clause 20, wherein the objective criteria include one or more of exposure, contrast, shadows, edges, undesirable streaks, occluding objects, sharpness, uniformity of illumination, and undesired reflections.

Clause 22. The system as recited in clause 20, wherein the biometric aspects include one or more of an eye surface, eye veins, eyelids, eyebrows, skin features, nose features, and iris features, wherein the iris features include one or more of colors, patterns, and musculature.

Clause 23. The system as recited in clause 15, further comprising an illumination source comprising a plurality of light-emitting elements configured to emit light towards the eye region to be imaged by the camera.

Clause 24. The system as recited in clause 23, wherein the light-emitting elements include light-emitting diodes (LEDs).

Clause 25. The system as recited in clause 23, wherein the light-emitting elements include infrared (IR) light sources, and wherein the camera is an infrared camera.

Clause 26. The system as recited in clause 15, wherein the system is a component of a head-mounted device (HMD), a handheld device, or a wall-mounted device.

Clause 27. A method, comprising:

performing, by a controller comprising one or more processors:

determining and evaluating a current eye pose of the user, wherein the eye pose indicates a current eye location and orientation with respect to a camera;

determining based on the evaluation that the current eye pose is not satisfactory for capturing images to be used in a biometric authentication process;

signaling the user to adjust their eye pose to improve a viewing angle of the camera with respect to the eye region; and performing biometric authentication for the user based on one or more images of the eye region of the user captured by the camera subsequent to the user adjusting their eye pose in response to the signal.

Clause 28. The method as recited in clause 27, wherein signaling comprises providing one or more of a haptic signal, an audio signal, and a visual signal to the user.

Clause 29. The method as recited in clause 27, wherein signaling includes sending a visual indication to a display located in front of the user's eyes.

Clause 30. The method as recited in clause 27, further comprising iteratively performing said determining and evaluating a current eye pose of the user, said determining that the current eye pose is not satisfactory for capturing images to be used in a biometric authentication process, and said signaling the user to adjust their eye pose to improve a viewing angle of the camera with respect to the eye region until a satisfactory eye pose is detected.

Clause 31. The method as recited in clause 27, wherein determining and evaluating a current eye pose of the user comprises analyzing one or more images of the eye region captured by the camera to determine if one or more objective criteria with regard to the eye region are achieved in the captured images.

Clause 32. The method as recited in clause 31, wherein the objective criteria include one or more of gaze direction, exposure, contrast, shadows, edges, undesirable streaks, occlusions, sharpness, uniformity of illumination, and undesired reflections.

Clause 33. The method as recited in clause 27, wherein the eye region includes one or more of an iris, an eye, a periorbital region, and a portion of the user's face.

Clause 34. The method as recited in clause 27, wherein performing biometric authentication for the user based on one or more images of the eye region of the user captured by the camera subsequent to the user adjusting their eye pose in response to the signal comprises:

analyzing quality of one or more biometric aspects captured in the one or more images according to one or more objective criteria;

selecting at least one biometric aspect according to the analysis; and performing the biometric authentication process based at least in part on the selected at least one biometric aspect.

Clause 35. The method as recited in clause 34, wherein the objective criteria include one or more of exposure, contrast, shadows, edges, undesirable streaks, occluding objects, sharpness, uniformity of illumination, and undesired reflections.

Clause 36. The method as recited in clause 34, wherein the biometric aspects include one or more of an eye surface, eye veins, eyelids, eyebrows, skin features, nose features, and iris features, wherein the iris features include one or more of colors, patterns, and musculature.

Clause 37. The method as recited in clause 27, further comprising emitting, by an illumination source comprising a plurality of light-emitting elements, light towards the eye region to be imaged by the camera.

Clause 38. The method as recited in clause 37, wherein the light-emitting elements include light-emitting diodes (LEDs).

Clause 39. The method as recited in clause 37, wherein the light-emitting elements include infrared (IR) light sources, and wherein the camera is an infrared camera.

Clause 40. The method as recited in clause 27, wherein the camera and controller are components of a head-mounted device (HMD), a handheld device, or a wall-mounted device.

Clause 41. A method, comprising:

performing, by a controller comprising one or more processors:

determining and evaluating a current eye pose of the user, wherein the eye pose indicates a current eye location and orientation with respect to the camera;

determining based on the evaluation that the current eye pose is not satisfactory for capturing images to be used in a biometric authentication process;

signaling the camera to adjust a viewing angle of the camera with respect to the eye region; and performing biometric authentication for the user based on one or more images of the eye region of the user captured by the camera subsequent to adjusting the viewing angle in response to the signal.

Clause 42. The method as recited in clause 41, further comprising iteratively performing said determining and evaluating a current eye pose of the user, said determining that the current eye pose is not satisfactory for capturing images to be used in a biometric authentication process, and said signaling the camera to adjust a viewing angle of the camera with respect to the eye region until a satisfactory eye pose is detected.

Clause 43. The method as recited in clause 41, wherein determining and evaluating a current eye pose of the user comprises analyzing one or more images of the eye region captured by the camera to determine if one or more objective criteria with regard to the eye region are achieved in the captured images.

Clause 44. The method as recited in clause 43, wherein the objective criteria include one or more of gaze direction, exposure, contrast, shadows, edges, undesirable streaks, occlusions, sharpness, uniformity of illumination, and undesired reflections.

Clause 45. The method as recited in clause 41, wherein the eye region includes one or more of an iris, an eye, a periorbital region, and a portion of the user's face.

Clause 46. The method as recited in clause 41, wherein performing biometric authentication for the user based on one or more images of the eye region of the user captured by the camera subsequent to the camera adjusting the viewing angle in response to the signal comprises:

analyzing quality of one or more biometric aspects captured in the one or more images according to one or more objective criteria;

selecting at least one biometric aspect according to the analysis; and performing the biometric authentication process based at least in part on the selected at least one biometric aspect.

Clause 47. The method as recited in clause 46, wherein the objective criteria include one or more of exposure, contrast, shadows, edges, undesirable streaks, occluding objects, sharpness, uniformity of illumination, and undesired reflections.

Clause 48. The method as recited in clause 46, wherein the biometric aspects include one or more of an eye surface, eye veins, eyelids, eyebrows, skin features, nose features, and iris features, wherein the iris features include one or more of colors, patterns, and musculature.

Clause 49. The method as recited in clause 41, further comprising emitting, by an illumination source comprising a plurality of light-emitting elements, light towards the eye region to be imaged by the camera.

Clause 50. The method as recited in clause 49, wherein the light-emitting elements include light-emitting diodes (LEDs).

Clause 51. The method as recited in clause 49, wherein the light-emitting elements include infrared (IR) light sources, and wherein the camera is an infrared camera.

Clause 52. The method as recited in clause 41, wherein the camera and controller are components of a head-mounted device (HMD), a handheld device, or a wall-mounted device.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:

a camera configured to capture images of an eye region of a user; and a controller comprising one or more processors configured to:

determine and evaluate, based on one or more of the images captured by the camera, a current eye pose of the user, wherein the eye pose indicates a current eye location and gaze direction with respect to the camera;

determine, based on the evaluation of the current eye location and the current gaze direction, that the current eye pose determined from the one or more images captured by the camera is not satisfactory for use in a biometric authentication process for biometric authentication of the user;

signal, responsive to the determination that the current eye pose is not satisfactory for the biometric authentication of the user, the camera to automatically adjust a viewing angle of the camera with respect to the eye region based on the current eye location and the current gaze direction and capture one or more additional images of the eye region of the user using the adjusted viewing angle; and perform the biometric authentication for the user based on the captured one or more additional images of the eye region of the user captured by the camera using the viewing angle automatically adjusted in response to the signal.

2. The system as recited in claim 1, wherein said determine and evaluate a current eye pose of the user, said determine that the current eye pose is not satisfactory for use in a biometric authentication process, and said signal the camera to automatically adjust a viewing angle of the camera with respect to the eye region are iteratively performed until a satisfactory eye pose is detected.

3. The system as recited in claim 1, wherein, to determine and evaluate a current eye pose of the user, the controller is configured to analyze one or more images of the eye region captured by the camera to determine if one or more objective criteria with regard to the eye region are achieved in the captured images.

4. The system as recited in claim 3, wherein the objective criteria include one or more of gaze direction, exposure, contrast, shadows, edges, undesirable streaks, occlusions, sharpness, uniformity of illumination, and undesired reflections.

5. The system as recited in claim 1, wherein the eye region includes one or more of an iris, an eye, a periorbital region, and a portion of the user's face.

6. The system as recited in claim 1, wherein, to perform biometric authentication for the user based on one or more additional images of the eye region of the user captured by the camera using the viewing angle automatically adjusted in response to the signal, the controller is configured to:

analyze quality of one or more biometric aspects captured in the one or more additional images according to one or more objective criteria;

select at least one biometric aspect according to the analysis; and perform the biometric authentication process based at least in part on the selected at least one biometric aspect.

7. The system as recited in claim 6, wherein the objective criteria include one or more of exposure, contrast, shadows, edges, undesirable streaks, occluding objects, sharpness, uniformity of illumination, and undesired reflections.

8. The system as recited in claim 6, wherein the biometric aspects include one or more of an eye surface, eye veins, eyelids, eyebrows, skin features, nose features, and iris features, wherein the iris features include one or more of colors, patterns, and musculature.

9. The system as recited in claim 1, further comprising an illumination source comprising a plurality of light-emitting elements configured to emit light towards the eye region to be imaged by the camera.

10. The system as recited in claim 9, wherein the light-emitting elements include light-emitting diodes (LEDs).

11. The system as recited in claim 9, wherein the light-emitting elements include infrared (IR) light sources, and wherein the camera is an infrared camera.

12. The system as recited in claim 1, wherein the system is a component of a head-mounted device (HMD), a hand-held device, or a wall-mounted device.

13. A method, comprising:

performing, by a controller comprising one or more processors:

determining and evaluating, based on one or more of the images captured by the camera, a current eye pose of a user, wherein the eye pose indicates a current eye location and gaze direction with respect to a camera;

determining, based on the evaluation of the current eye location and the current gaze direction, that the current eye pose determined from the one or more images captured by the camera is not satisfactory for use in a biometric authentication process for biometric authentication of the user;

signaling, responsive to the determination that the current eye pose is not satisfactory for the biometric authentication of the user, the camera to automatically adjust a viewing angle of the camera with respect to the eye region based on the current eye location and the current gaze direction and capture one or more additional images of the eye region of the user using the adjusted viewing angle; and performing the biometric authentication for the user based on the captured one or more additional images of the eye region of the user captured by the camera using the viewing angle automatically adjusted in response to the signal.

14. The method as recited in claim 13, further comprising iteratively performing said determining and evaluating a current eye pose of the user, said determining that the current eye pose is not satisfactory for use in a biometric authentication process, and said signaling the camera to automatically adjust a viewing angle of the camera with respect to the eye region until a satisfactory eye pose is detected.

15. The method as recited in claim 13, wherein determining and evaluating a current eye pose of the user comprises analyzing one or more images of the eye region captured by the camera to determine if one or more objective criteria with regard to the eye region are achieved in the captured images.

16. The method as recited in claim 15, wherein the objective criteria include one or more of gaze direction, exposure, contrast, shadows, edges, undesirable streaks, occlusions, sharpness, uniformity of illumination, and undesired reflections.

17. The method as recited in claim 13, wherein the eye region includes one or more of an iris, an eye, a periorbital region, and a portion of the user's face.

18. The method as recited in claim 13, wherein performing biometric authentication for the user based on one or more additional images of the eye region of the user captured by the camera using the viewing angle automatically adjusted in response to the signal comprises:

analyzing quality of one or more biometric aspects captured in the additional one or more images according to one or more objective criteria;

selecting at least one biometric aspect according to the analysis; and performing the biometric authentication process based at least in part on the selected at least one biometric aspect.

19. The method as recited in claim 18, wherein the objective criteria include one or more of exposure, contrast, shadows, edges, undesirable streaks, occluding objects, sharpness, uniformity of illumination, and undesired reflections.

20. The method as recited in claim 18, wherein the biometric aspects include one or more of an eye surface, eye veins, eyelids, eyebrows, skin features, nose features, and iris features, wherein the iris features include one or more of colors, patterns, and musculature.

* * * * *